US008069091B1

(12) United States Patent
Callen, Jr. et al.

(10) Patent No.: US 8,069,091 B1
(45) Date of Patent: Nov. 29, 2011

(54) APPARATUS, SYSTEM AND METHOD FOR EMBROIDERY DESIGN

(75) Inventors: Andrew B. Callen, Jr., Acton, MA (US); Christian Haynes, Ashby, MA (US)

(73) Assignee: Corporate Casuals, LLC., Concord, MA (US)

( * ) Notice: Subject to any disclaimer, the term of this patent is extended or adjusted under 35 U.S.C. 154(b) by 944 days.

(21) Appl. No.: 11/748,238

(22) Filed: May 14, 2007

Related U.S. Application Data

(60) Provisional application No. 60/833,883, filed on Jul. 27, 2006.

(51) Int. Cl.
*G06Q 30/00* (2006.01)

(52) U.S. Cl. .................................................... 705/26.5

(58) Field of Classification Search .................... 705/26, 705/27, 26.1, 26.5
See application file for complete search history.

(56) References Cited

U.S. PATENT DOCUMENTS 5,822,428 A 10/1998 Gardner
6,148,247 A * 11/2000 Kaymer et al. ............... 700/138
6,196,146 B1 3/2001 Goldberg et al.
6,209,467 B1 4/2001 Tomita
6,216,618 B1 4/2001 Goldberg et al.
6,502,006 B1 12/2002 Laufer et al.
6,804,573 B2 10/2004 Goldman
6,813,535 B2 11/2004 Akira et al.
6,859,679 B1 2/2005 Smith et al.
6,889,111 B2 5/2005 Tomita
2003/0212470 A1 11/2003 Kaymer et al.
2004/0083022 A1 4/2004 Akira et al.
2005/0060058 A1 3/2005 Cameron et al.
2005/0238251 A1* 10/2005 Lunetta et al. ................ 382/284
2007/0198119 A1* 8/2007 Bailie ........................... 700/138
2007/0203609 A1* 8/2007 DeCastro ...................... 700/138

OTHER PUBLICATIONS

Anonymous, "For a Stylish Gift, Give Him a Monogrammed Shirt (Special Father's Day Offer)," May 29, 2003, PR Newswire.*

* cited by examiner

*Primary Examiner* — Jeffrey A Smith
*Assistant Examiner* — Brandy A Zukanovich
(74) *Attorney, Agent, or Firm* — Lando & Anastasi, LLP

(57) ABSTRACT

A method of generating a stitch file for an embroidery design selected by a user where the embroidery design includes a plurality of elements. According to one embodiment, the method includes acts of rendering an image of the selected embroidery design at a display visible to the user, receiving an order placed electronically by the user for the embroidery design; and generating, following the act of receiving, a stitch file corresponding to the embroidery design, wherein the embroidery design includes both text elements and design elements.

26 Claims, 16 Drawing Sheets

Figure 8:
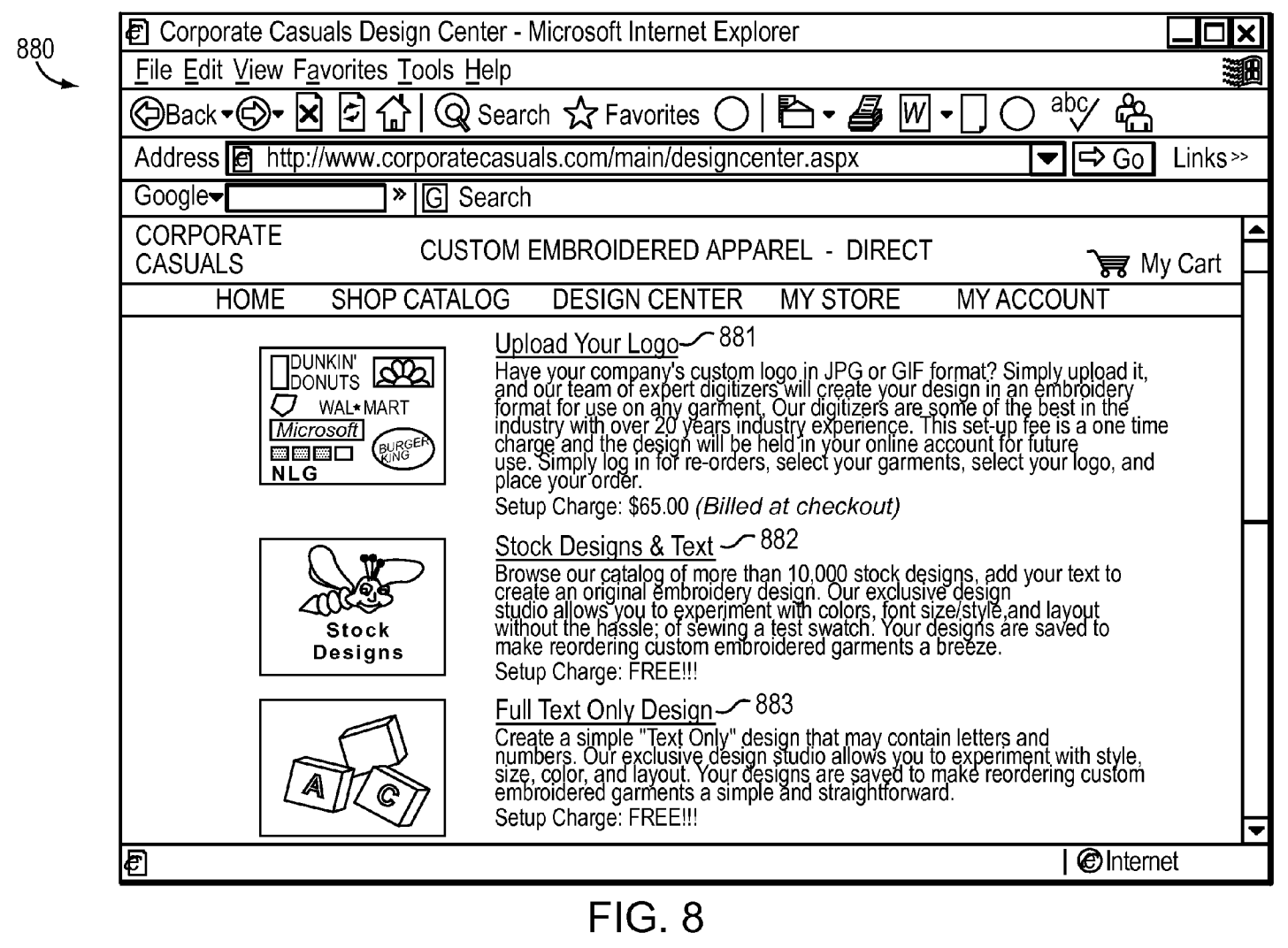

880

Corporate Casuals Design Center - Microsoft Internet Explorer

File Edit View Favorites Tools Help

Back Search Favorites abc

Address http://www.corporatecasuals.com/main/designcenter.aspx Go Links>>

Google Search

CORPORATE CASUALS

CUSTOM EMBROIDERED APPAREL - DIRECT

My Cart

HOME SHOP CATALOG DESIGN CENTER MY STORE MY ACCOUNT

DUNKIN' DONUTS WAL★MART Microsoft BURGER KING NLG

Upload Your Logo 881

Have your company's custom logo in JPG or GIF format? Simply upload it, and our team of expert digitizers will create your design in an embroidery format for use on any garment. Our digitizers are some of the best in the industry with over 20 years industry experience. This set-up fee is a one time charge and the design will be held in your online account for future use. Simply log in for re-orders, select your garments, select your logo, and place your order.

Setup Charge: $65.00 *(Billed at checkout)*

Stock Designs

Stock Designs & Text 882

Browse our catalog of more than 10,000 stock designs, add your text to create an original embroidery design. Our exclusive design studio allows you to experiment with colors, font size/style,and layout without the hassle; of sewing a test swatch. Your designs are saved to make reordering custom embroidered garments a breeze.

Setup Charge: FREE!!!

A C

Full Text Only Design 883

Create a simple "Text Only" design that may contain letters and numbers. Our exclusive design studio allows you to experiment with style, size, color, and layout. Your designs are saved to make reordering custom embroidered garments a simple and straightforward.

Setup Charge: FREE!!!

Internet

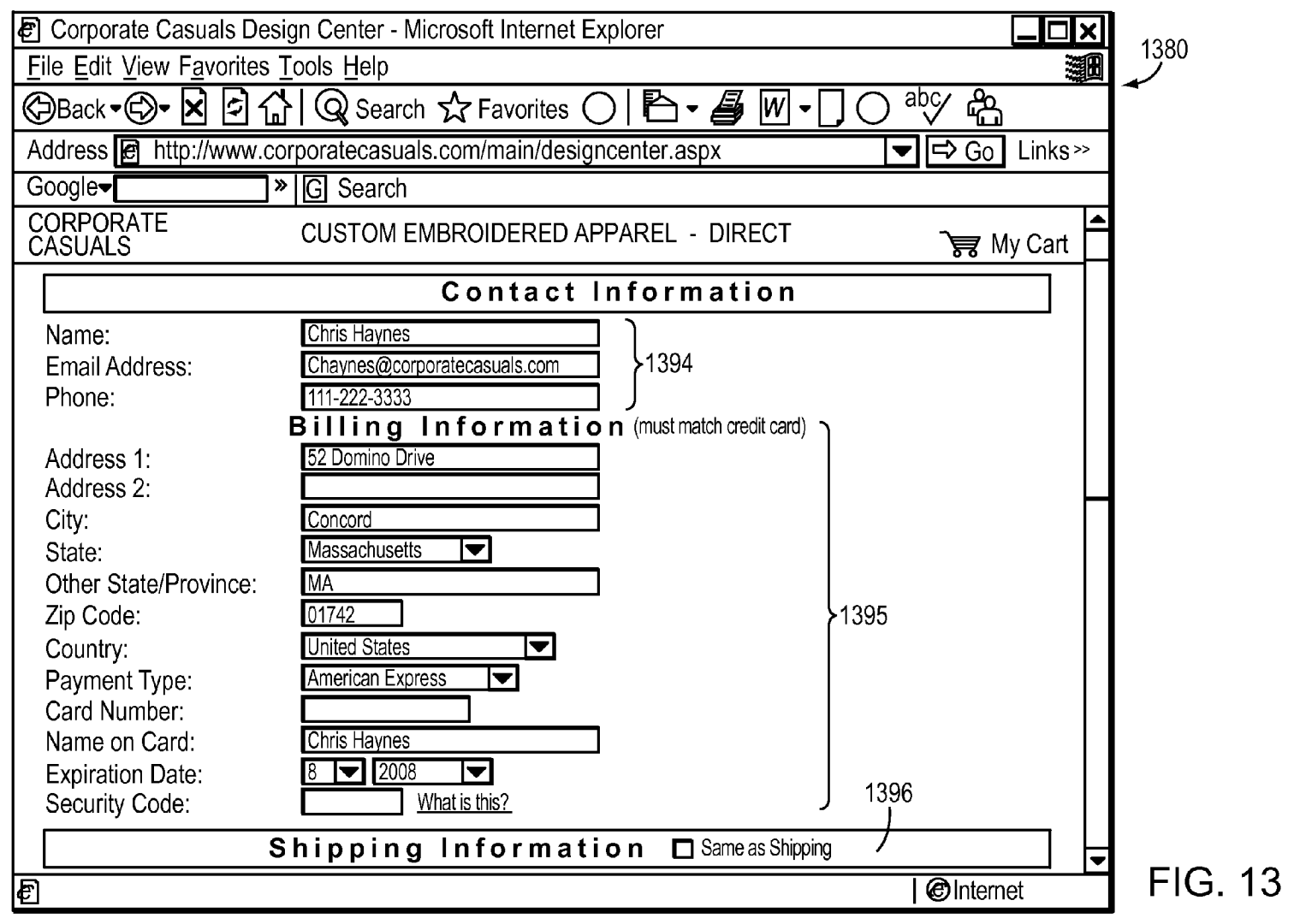

Corporate Casuals Design Center - Microsoft Internet Explorer

File Edit View Favorites Tools Help

Back Search Favorites

Address http://www.corporatecasuals.com/main/designcenter.aspx Go Links >>

Google Search

CORPORATE CASUALS

CUSTOM EMBROIDERED APPAREL - DIRECT

My Cart

Contact Information

Name: Chris Haynes

Email Address: Chaynes@corporatecasuals.com

Phone: 111-222-3333

1394

Billing Information (must match credit card)

Address 1: 52 Domino Drive

Address 2:

City: Concord

State: Massachusetts

Other State/Province: MA

Zip Code: 01742

Country: United States

Payment Type: American Express

Card Number:

Name on Card: Chris Haynes

Expiration Date: 8 2008

Security Code: What is this?

1395

Shipping Information Same as Shipping

1396

Internet

FIG. 13

APPARATUS, SYSTEM AND METHOD FOR EMBROIDERY DESIGN

RELATED APPLICATIONS

This application claims the benefit under 35 U.S.C. §119 (e) to U.S. Provisional Application Ser. No. 60/833,883, entitled "APPARATUS, SYSTEM AND METHOD FOR GENERATING AN EMBROIDERY DESIGN," filed on Jul. 27, 2006, which is herein incorporated by reference in its entirety.

BACKGROUND OF INVENTION

1. Field of Invention

Embodiments of the invention relate generally to embroidery. More specifically, at least one embodiment relates to an apparatus, system and method for generating a stitch file corresponding to an embroidery design selected by a user.

2. Discussion of Related Art

It is common for individuals and businesses to select apparel and other items with custom embroidered designs, (for example, a logo, a team name, etc.) which they distribute or sell to family, friends, employees and customers, for example, to generate goodwill, build a brand, and/or market a business product or service. Often, the embroidery design is personalized with the recipient's name. As with many other types of commercial transactions, there is an interest in allowing users to select and purchase these items on-line where the items include the selected custom designs/logos. Existing processes, however, do not provide an effective on-line ordering process for customized items that include embroidered text and/or designs because the conversion of an image selected on-line to a stitch file is a relatively complex process.

Modern embroidery machines employ software to stitch an embroidered item including selected text and design elements onto apparel or other material, e.g., a hat, a shirt, a jacket, a wall hanging, etc. Generally, the embroidered design is included in a digital stitch file which is provided to the embroidery machine for processing and execution.

Each machine may include multiple stitch heads each with a plurality of spools that may each hold a different color thread. A separate item of apparel or other material is secured in the stitching region adjacent one or more of the stitch heads and the embroidery machine processes the digital stitch file and operates one or more of the stitch heads to create the embroidered design on the items of apparel. Some embroidery machines that include multiple stitch heads are "gang operated" because the material located at each stitch head is simultaneously moved in identical x-y coordinates while being stitched.

One known approach to the on-line ordering of embroidery designs requires the real-time generation of a digital stitch file corresponding to the text and/or design before the user can finalize and order the design. In practice, the approach is not suitable for on-line selection and automatic execution of an embroidery design order. In particular, the on-line order process is delayed using current approaches because an embroidery stitch file must be created for each design before the image of the completed design can be presented to the user in their Internet browser (e.g., rendered). That is, the generation of the embroidery digital stitch file and the rendering of the graphic image both occur prior to the user finalizing and ordering the embroidered design. Such an approach generally results in poor quality embroidered designs because current approaches attempt to convert user selected images (e.g., graphic files) to digital stitch files for execution by a stitching machine. That is, some current approaches employ a process in which an image file is "digitized" to generate a digital stitch file.

Further, known approaches provide only a single style of text per font size which are based on keyboard lettering. This keyboard lettering and the corresponding stitch pattern are then "force-fit" into embroidery orders and when stitched do not provide a high quality finished look desired by customers.

SUMMARY OF INVENTION

In accordance with one or more embodiments, the present invention provides a system and method to allow the efficient selection and ordering, by a remote user, of items that include customized embroidery designs. For example, where the selection and ordering is accomplished on-line, in one embodiment, images of the digital stitch files corresponding to elements included in an embroidery design are pre-rendered and communicated to the user's web browser. In one embodiment, the user selects a customized embroidery design by reviewing pre-rendered images of text elements and design elements supplied to the browser before an order is placed. Further, in one embodiment, the user can edit the customized embroidery design using additional pre-rendered images that are cached in the user's web browser in advance of being selected by the user.

In one aspect, the present invention provides an embroidery system including an image cache module configured to store a plurality of pre-rendered images of embroidery stitch files, including pre-rendered images of stitch files corresponding to embroidered text elements, for transmission over a network to a user device, and an order server configured to receive an order for an embroidery design selected by a user and transmitted over the network. In accordance with one embodiment, the system is further configured to generate a stitch file corresponding to the embroidery design selected by the user after the receipt of the order where the embroidery design includes both text elements and design elements.

In another aspect, the present invention provides a method of generating a stitch file for an embroidery design selected by a user where the embroidery design includes a plurality of elements. According to one embodiment, the method includes acts of rendering an image of the selected embroidery design at a display visible to the user, receiving an order placed electronically by the user for the embroidery design; and generating, following the act of receiving, a stitch file corresponding to the embroidery design, wherein the embroidery design includes both text elements and design elements.

In one aspect, the present invention provides systems and methods that employ a rules engine to correct the spacing of embroidered elements in the stitched design. In one embodiment, the rules engine is adapted based on the rules used to correct the spacing in a plurality of user designs.

In a further aspect, the invention provides a system for generating an embroidery design selected by a user. The system includes an image cache module adapted to store a plurality of pre-rendered images of embroidery stitch files for transmission over a network to a user device. The system also includes a rules module adapted to generate a stitch file corresponding to the embroidery design selected by the user.

In yet another aspect, the invention provides a method of generating a stitch file for an embroidery design selected by a user where the embroidery design includes a plurality of elements. The method includes the acts of rendering an image of the selected embroidery design at a display visible to the user, receiving an order placed electronically by the user for the embroidery design, and generating, following the act of receiving, a stitch file corresponding to the embroidery design where the embroidery design includes both text elements and design elements.

In another embodiment, the invention provides a method of generating a stitch file for an embroidery design selected by a user where the embroidery design includes a plurality of elements. The method includes acts of displaying an image of a first user selected embroidery design at a display visible to the user where the first user selected embroidery design includes at least one text element, and displaying an image of a second user selected embroidery design at the display where the second user selected embroidery design includes a text element that is an edited version of the at least one text element appearing in the first user selected embroidery design. Also, the text element that is the edited version is included in the image of the second user selected design based on a pre-rendered image supplied to the user's display software when the first user selected embroidery design is selected.

In a still further embodiment, the invention provides a method of generating a stitch file for a user selected embroidery design including a plurality of elements. The method includes the acts of receiving an order placed electronically for the embroidery design and generating a stitch file corresponding to the embroidery design using a rules engine to adjust a spacing of at least one of the plurality of elements relative to at least one other of the plurality of elements.

In yet a further embodiment, the invention provides a method of automatically stitching an embroidery design electronically selected by a user. The method includes the acts of providing the user with a plurality of pre-rendered images of embroidered elements including pre-rendered images of embroidered text, receiving an order for the embroidery design including a plurality of embroidered elements selected by the user, applying a set of rules to adjust the spacing between two or more of the embroidery elements to generate a stitch file corresponding to the embroidered design, communicating the stitch file to a stitching machine, and stitching the embroidery design on a material selected by the user.

In another embodiment, the invention provides a method of digitizing a plurality of embroidery designs for stitching on a multihead stitching machine. The method includes acts of compiling a single stitch file wherein the single stitch file includes a separate set of instructions for each of the plurality of embroidery designs, providing an instruction in the single digital stitch file that causes one or more stitch heads to stop stitching upon completion of one set of instructions, and stitching another embroidery design based on another set of instructions following the completion of the one set of instructions.

In still another embodiment, the invention provides a method of generating a stitch file corresponding to a user selected embroidery design. The method includes the acts of transmitting images of embroidered letters to a user's display device where the images are stored in a graphics file format in a cache included in the display device, receiving an order for the user selected embroidery design, and generating a stitch file corresponding to the user selected embroidery design where the embroidery design includes at least one letter corresponding to one of the transmitted images.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 8 illustrates a display employed to select an embroidery design in accordance with one embodiment of the invention.

FIG. 13 illustrates another display that can be employed to order an embroidery design in accordance with one embodiment of the invention.

DETAILED DESCRIPTION

Figure 1:
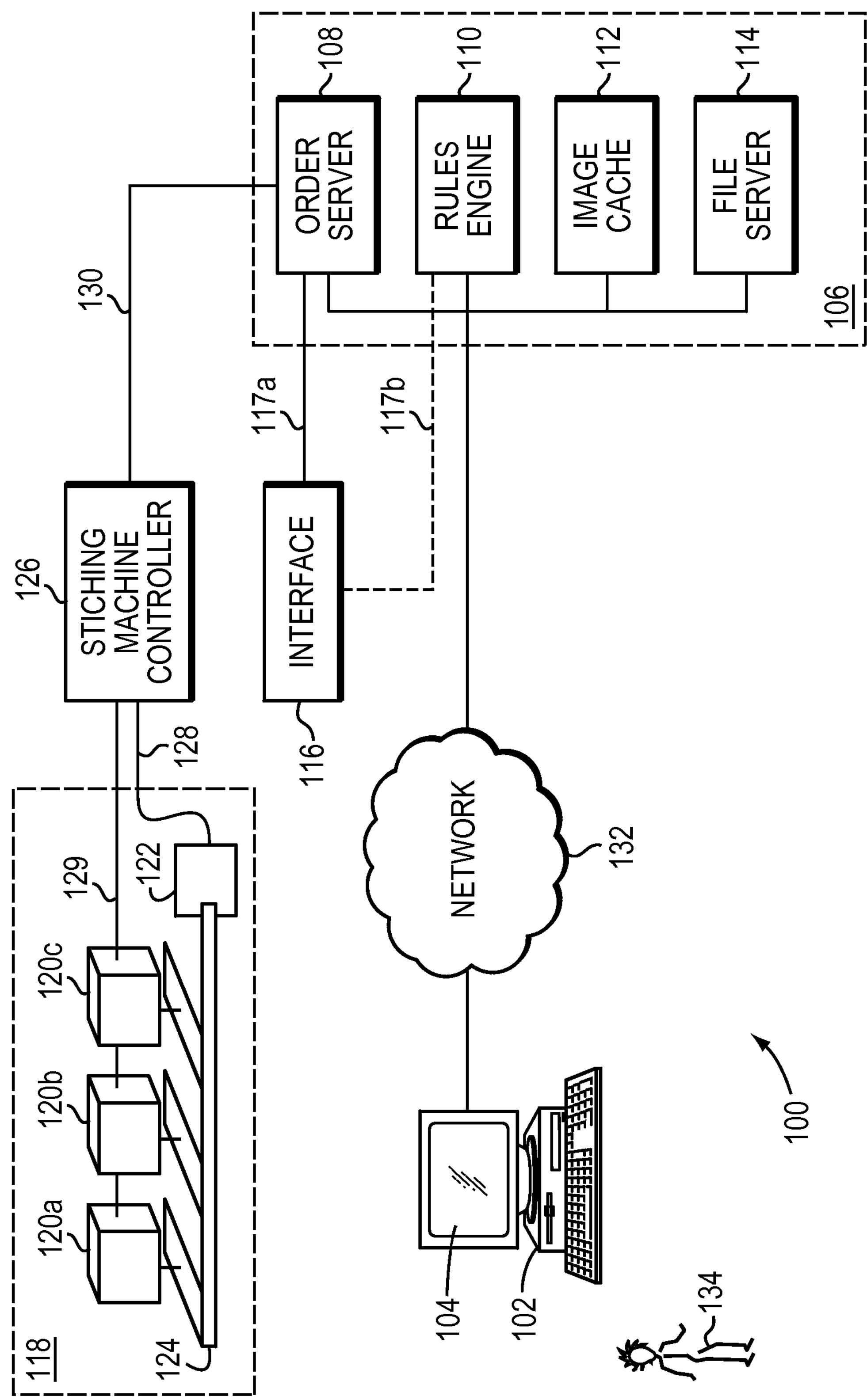
FIG. 1 illustrates an embroidery system in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring to FIG. 1, an embodiment of a system 100 for generating an embroidery design selected by a user is shown. The system 100 includes a user device 102 including a display 104 where the user device may be, for example, a personal computer including any of a desktop computer, a laptop computer and a notebook computer, a personal digital assistant, a cell phone or any other device including a processor and a display. The system 100 can also include a host computer 106 that may operate as a server or a plurality of servers. According to one embodiment, the user device 102 is remotely located from the host computer 106.

In one embodiment, the host computer 106 includes an order server 108, a rules engine 110, an image cache 112 and a file server 114. The host computer 106 may be a single computer or a plurality of computers and the invention is not intended to limit the host computer to any specific quantity of computers or servers. According to one embodiment, each of the order server 108, the rules engine 110, the image cache 112 and the file server 114 is a module included in the host computer 106.

In accordance with one embodiment, the system 100 includes an interface 116 that can be included to allow an operator to review and edit embroidery designs prior to the designs being finalized for stitching. It should be apparent to those of skill in the art that the interface 116 may be included as an element of the host computer 106, or alternatively, the interface may be a standalone element that can communicate with the host computer 106 via a communication link. As illustrated in FIG. 1, for example, the interface 116 may communicate with the order server via communication link 117A or with the rules engine 110 via the communication link 117B. In addition, the system can be configured such that the interface can communicate with a plurality of elements of the host computer via a communication link.

According to one embodiment, the system 100 includes a stitching machine 118 including one or more stitch heads 120A, 120B, 120C, an actuator 122 and an operating link 124. The stitching machine 118 also includes a stitching machine controller 126 that, according to one embodiment, communicates with the actuator 122 over a communication link 128 and with the stitch heads over the communication link 129. In various embodiments, the stitching machine controller 126 may receive digital stitch files from the host computer 106 for execution by the stitching machine 118. In one version, an embroidery design is generated/stitched when the digital stitch file is executed. For example, a communication link 130 may provide a signal path for the communication of the digital stitch files from the host computer 106 (e.g., from the order server 108) to the stitching machine controller 126. In another embodiment, a digital stitch file which is ready for execution is downloaded to a storage medium (e.g., a magnetic disk) which is transferred to the stitching machine controller 126. Regardless of the method by which the digital stitch file is transferred to the stitching machine controller, once received, the digital stitch file is processed by the stitching machine controller 128. The stitching machine controller 126 provides control signals to the actuator 122 (e.g., an electro-mechanical or electro-hydraulic actuator) and to the stitch heads 120 to both move the workpiece (e.g., via the operating link 124) and instruct the stitch heads 120 regarding their operating cycles. That is, the stitching machine controller 126 provides the stitch heads with instructions that determine, for example, when the stitch head should be stitching and the selected spool of thread that should be used.

In accordance with one embodiment, the user device 102 is connected to the host computer 106 over a network 132. The network 132 may be a wireless communication link, a hardwired communication link, a fiber optic communication link, as well as a combination of any of the preceding or any other any communication link capable of transmitting signals between the user device 102 and the host computer 106. In one embodiment, the network 132 is a wide area network ("WAN"). In a version of this embodiment, the network is the Internet. Further, the network may include a plurality of separate interconnected networks.

In general, a user 134 employs the user device 102 to select an embroidery design (e.g., a custom embroidery design) an image of which is supplied from the host computer to the user device 102 via the network 132. According to one embodiment, the user 134 may select an item to be stitched, a location on the item where the embroidered design will be located and also customize the design including both text elements and design elements. The user 134 views the design located on the item in the display 104 and may edit the design during the selection process. Once the design meets the user's approval, the user may transmit an order for the design to the host computer 106 where the order is converted to a finalized stitch file for processing and execution by the stitching machine 118. In one embodiment, the host computer 106 is located at the location of the stitching machine 118.

Figure 2:
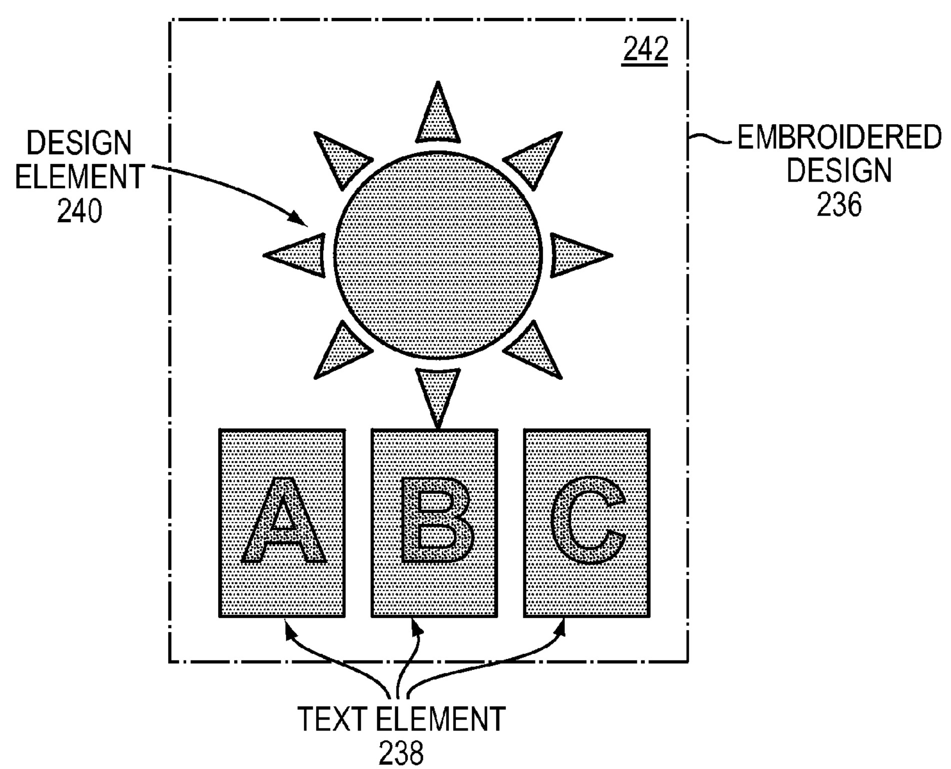
FIG. 2 illustrates an embroidery design in accordance with one embodiment of the invention.

In accordance with one embodiment, the embroidery design may include both text elements and design elements. For example, FIG. 2 illustrates an embroidery design 236 that includes one or more text elements 238 and one or more design elements 240. In this example, the design element 240 is a sun that appears above the text elements, i.e., the letters "A," "B," and "C." Also shown is a stitching region 242 which corresponds to the region where the embroidery design is located. In general, the system 100 allows the user 234 to select embroidery elements from a group of stock designs and stock text elements where the text elements are selected from groups of text elements having common characteristics such as their font type, font size, and color. In addition, the system allows the user to create their own custom design elements and store them for future use. Regardless of the source of the embroidery elements, the system 100 allows users to customize their embroidery design by, for example, applying text elements to spell out a company name or the name of the recipient of the embroidered item and select colors used to stitch the text elements and the design elements.

Generally, a user selects an embroidery design after they have an opportunity to view an image that represents the stitched embroidery design. The user's expectations as to the appearance of the design are established during the ordering process. Current approaches convert a bitmap image of a user selected embroidery design to a digital stitch file. Often, the quality of the stitched embroidery design suffers, however, because the conversion of an image to corresponding digital stitch file is relatively difficult. First, embroidered designs are three dimensional by nature. For example, embroidered designs often include multiple layers of overlapping threads. Second, the stitching process repositions the material in the vicinity of the stitches when the needle penetrates the material being stitched (e.g., at a first x-y coordinate), and runs a thread along a surface of the material before penetrating the material again (e.g., at a second x-y coordinate). That is, stitching creates forces that may act to pull the material outward from a stitched element and/or draw material inward towards the stitched region of the stitched element. The direction in which the material moves varies depending on the element. For example, stitching the letter "o" tends to draw material inward around the letter towards the center of the "o" while the stitching of the letter "i" tends to stretch the material outward from the letter.

In addition, in general, the human mind may perceive the spacing between text differently than the actual spacing. The shape of adjacent letters for example impacts the human perception. For example, when equal spacing is used between characters, the human mind perceives that a pair of the letters "I" placed adjacent one another are further apart than the adjacent letters "A" and "W." This perception results despite the fact that the shank or shaft of the letters are equidistant in each case. Today, word processing software addresses the problem when text is either displayed electronically or printed. The process of adjusting character spacing to compensate for the perception of a human viewer is sometimes referred to as "kerning." For example, as a result of a kerning process, text is displayed with a different amount of space appearing on either side of a "m" than the amount of space that appears on either side of an "i." In general, a kerning process can adjust the spacing of any adjacent characters.

A problem for prior approaches to on-line embroidery is that they attempt to convert images selected by the user to a digital stitch file. The conversion of design selected by the user to a digital stitch file corresponding to the selected design, however, is unlikely to generate a high quality embroidery design that, for example, properly addresses character spacing.

In particular, prior approaches digitize images of text elements that are provided as "keyboard" lettering (e.g., block letters). This approach adversely affects the quality of the embroidery produced by prior approaches because a single stitch pattern is employed regardless of the font size selected. That is, a single stitch pattern of a selected text element is scaled up or down depending upon the selected font size. In practice, however, the appearance (e.g., the resolution) of a stitched text element over a variety of font sizes is often improved if, for example, a different stitch pattern is employed for each of a smaller font size and a larger font size, respectively. Further, a different stitch pattern may also be employed for each of three or more font sizes of the same character.

Figure 16:
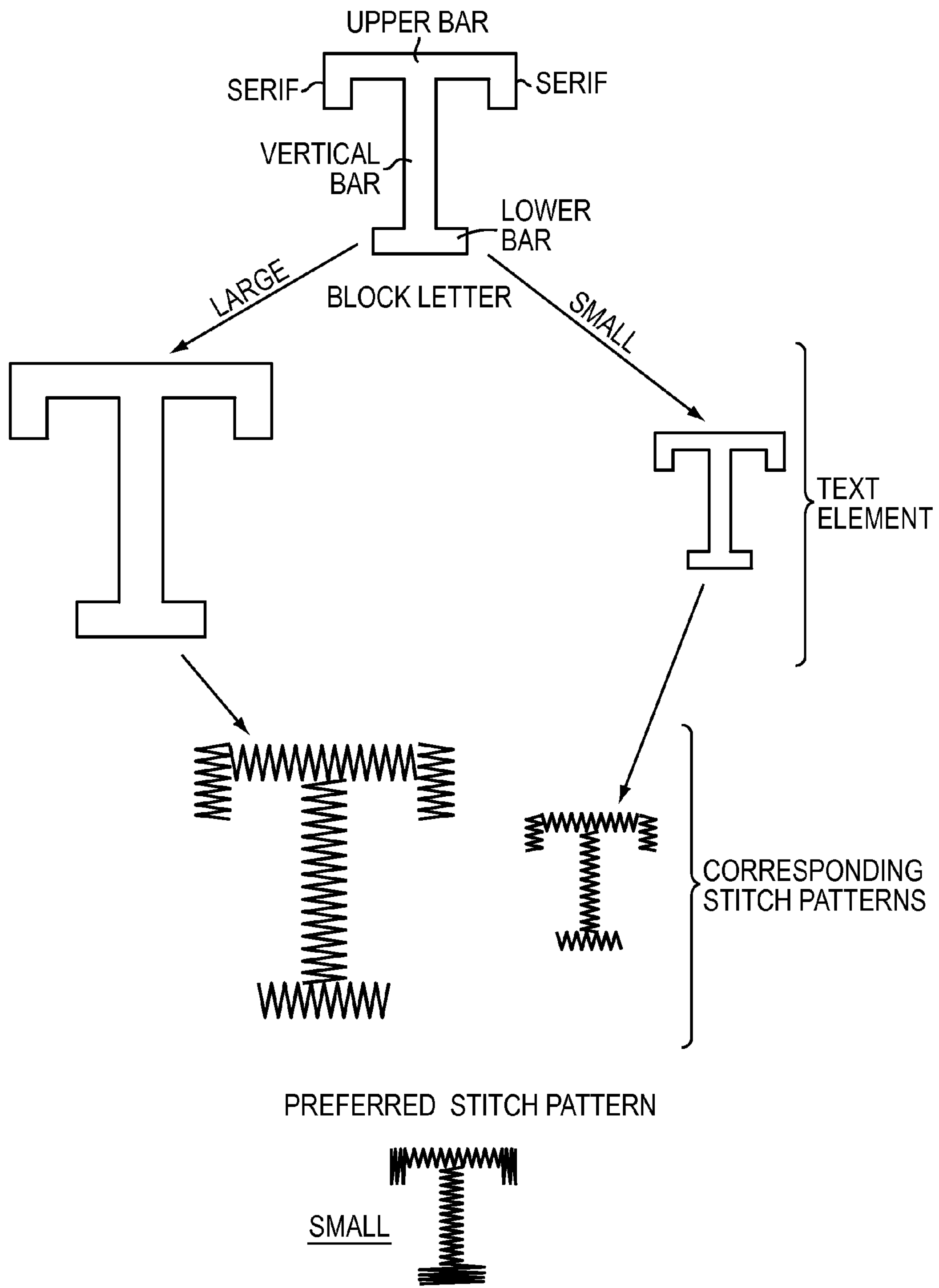
FIG. 16 illustrates stitch patterns corresponding to a text element in accordance with one embodiment.

Referring to FIG. 16, a block letter "T" including an upper bar with a serif located at each end, a lower bar and a vertical bar located between the upper and lower bars. In a simplified example, the T can be included in an embroidery design in either a "small" font size or a "large" font size. Prior approaches convert the text element to a digital stitch file which includes the same stitch pattern scaled up or down depending upon the selected font size. The resulting stitch patterns are shown as the two corresponding stitch patterns on the right of the figure. Thus, each of the corresponding stitch patterns includes vertical stitching to complete the lower bar and the majority of the upper bar. Each of the corresponding stitch patterns employ horizontal stitching to complete the vertical bar and the serifs. In this example, although the large "T" may be of an acceptable quality when stitched, the small "T" may not provide an acceptable quality when stitched. For example, the serifs may not be as clearly delineated as necessary to provide a high-quality appearance.

According to one embodiment of the invention, the digital stitch files of a text element may include a first stitch pattern corresponding to a first font size and a second stitch pattern corresponding to a second font size where the first stitch pattern and the second stitch pattern are different stitch patterns. For example, the letter "T" in a large font size may be stitched as illustrated in the corresponding stitch patterns and the letter "T" in a small font size may be stitched as illustrated in the preferred stitch pattern. In one embodiment, the preferred stitch pattern employs vertical stitching for the upper horizontal bar and the serifs, and employs horizontal stitching for the vertical bar and the lower horizontal bar. In one embodiment, the preferred stitch pattern provides a stitched "T" that has a crisper appearance because the edges of the "T" appear better defined when stitched.

According to one embodiment of the invention, a kerning process as applied to embroidered items should account for both human perception of character spacing and the "push" and "pull" of the material caused by the stitching process. Thus, although a digital image of an embroidered item that includes an "O" and an "I" of the same font size may illustrate the two characters as having equal heights, according to one embodiment, a digital stitch file that includes the two characters will provide a vertical dimension of the "I" that is less than the vertical dimension included of the "O." In one embodiment, the difference in the vertical dimension results in two characters of substantially equal height when embroidered because the "I" elongates and the diameter of the "O" shrinks when the two characters are stitched.

According to one embodiment, a rules-generating process is employed whereby an embroidery designer reviews a selected design to determine whether rules should be generated to provide a kerning process for a particular text element or a particular relationship between text elements. The rules developed by the embroidery designer may applied to the selected design and other designs that are subsequently submitted for execution (i.e., stitching).

In various embodiments, the present invention may provide high quality embroidered designs that include proper character spacing (e.g., include a kerning process) by converting digital stitch files of commonly used design elements (e.g., stock designs) and text elements (e.g., block lettering in a size 10 font) to images of the corresponding embroidered element (e.g., an individual graphics file). The user can view the images when creating their embroidery design. Where, in various embodiments, each element/image employed by the user is associated with a digital stitch file the system can generate a stitch file for the complete embroidery design from the individual stitch files instead of generating the stitch file from the graphics file (e.g., from the bitmap image). In one embodiment, the stitch file for the complete embroidery design is generated by compiling the stitch file from the individual stitch files associated with each text and/or design element included in the embroidery design. Further, in one embodiment, the present invention provides a library of digital stitch files and corresponding image files of text elements in a plurality of font sizes (e.g., for each letter of the alphabet). In various embodiments, the libraries may be referred to for a plurality of orders and may reduce or substantially eliminate custom kerning on a per order basis.

Figure 3:
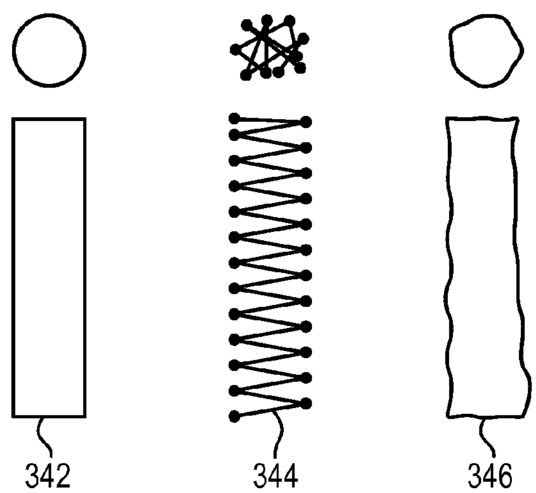
FIG. 3 illustrates three versions of a text element in accordance with one embodiment of the invention.

FIG. 3 illustrates a text element 342, a plot 344 corresponding to the stitching used to create the element, and an image 346 of the embroidered text element to provide an example of the various forms of each element that should be considered in a system for electronically selecting and ordering an embroidered design. Here, the text element 342 is a lower case "i" in a block format. The plot 344 illustrates a simplified representation of the stitching that is used to embroider a lower case "i" in block format. In one embodiment, the plot 344 is converted to a set of instructions for a stitching machine, for example, a digital stitch file that provides the instruction set to the stitching machine for stitching the lower case "i" in block format. In one embodiment, the digital stitch file corresponding to the plot 344 is converted to an image 346 of an embroidered lower case "i" in block format (e.g., a 3D image). Thus, in one embodiment, an individual file in a graphics file format is generated from the digital stitch file for the letter "i."

In accordance with one embodiment, the host computer 106 generates a digital stitch file for each letter of the alphabet in block format. In one embodiment, the host computer 106 generates a set of digital stitch files for a family of letters that include each letter of the alphabet in block format in a font size common to each letter (e.g., a font size of 8, 10, 12, etc.). The host computer also generates an image corresponding to each digital stitch file, i.e., generates a file in a graphics file format corresponding to each digital stitch file. The host computer 106 stores the graphics files in the image cache 112. Further, in one embodiment, the family of letters having the common font size is stored in a specific color, e.g., red, black, etc. In this embodiment, a separate digital stitch file is generated for each of the block style letters in the font size and the color red. Thus, in one version, the family of letters results in twenty-six separate digital stitch files. In another embodiment, the family for the block style letters in the common font size and the color red also includes numbers in the same size, style and color and a separate stitch file is created for each. In this example, the family includes twenty-six letters and ten numerals, e.g., the numbers 0-9. A digital stitch file for each of the block style letters capitalized, in the same size, style and color may further increase the size of the family. Thus, a family of 52 letters and 10 numerals results for the family of lower and upper case characters. Symbols such as asterisks and the like can also be included in each family. Thus, a text element may be a letter, a numeral and/or a symbol. A separate graphics file can be generated for each family member.

According to one embodiment, the host computer 106 converts each of the digital stitch files to a graphics file that provides a 3D image of a stitched version of the respective letter or number. These images can be stored in the image cache 112. In a further embodiment, other text families are digitized and converted to graphics files in a similar manner. In one embodiment, the image cache 112 stores the images (e.g., the graphics files) of the elements included in each of the text families.

According to a further embodiment, design elements (symbols, logos, etc.) may also be digitized such that a separate digital stitch file is generated for each of the design elements. According to one embodiment, a separate stitch file is generated for each color version of a single design element, for example, a yellow lighting bolt results in a first digital stitch file and a gold lighting bolt results in a second digital stitch file. In one embodiment, each of the stitch files corresponding to the design elements is digitized and converted to a graphics file to provide an image of the embroidered design element. In one embodiment, the image cache 112 may also store the images of each of the design elements.

In general, text elements include the characters that represent the embroidered letters of the alphabet. In addition, text elements may also include numerals, and in some embodiments symbols that are available on a standard computer keyboard. In general, a design element is an embroidered element that includes at least one object that is not text. As is described further herein, design elements may include text. For example, a design element may include an exploding firecracker with text that spells out "BOOM".

Figure 4:
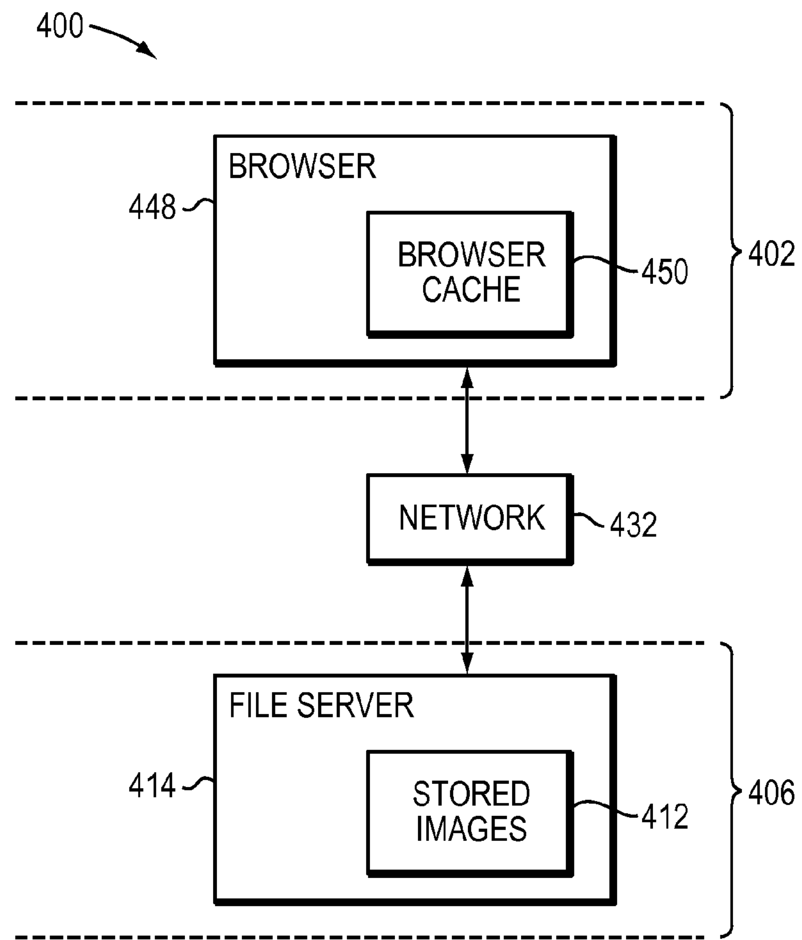
FIG. 4 illustrates a block diagram of a portion of the system of FIG. 1 in accordance with one embodiment of the invention.

Referring now to FIG. 4, a high level view of a part of a system 400 that provides cached images to the user's display device is illustrated in accordance with one embodiment. The system 400 includes a host computer 406 including a file server 414 and stored images 412. According to one embodiment, the stored images 412 are stored in the file server 414, for example, in an image cache. As previously described with reference to FIG. 1, however, the stored images 412 may be stored elsewhere in the system 400 provided that they are accessible for transmission from the host to a user display device 402. In one embodiment, the system 400 includes a network 432 that connects the file server host computer 406 to the user display device 402.

In accordance with various embodiments, the stored images are graphic files in PNG, JPEG, TIFF, or GIF format. In addition, the stored images may be stored in other file-types provided that the file-type is suitable for storing an image of an embroidered item which can be transmitted over the network 432 and presented to the user with the user display device 402. The images may include stock design elements, stock text elements and pre-rendered images of custom design or text elements previously created for the user.

According to one embodiment, the user display device 402 includes a browser 448 having an associated browser cache 450. In one embodiment, the browser 448 may be a web browser. For example, the browser 448 may be any one of Microsoft Internet Explorer, Mozilla Firefox, Opera, Maxthon, Netscape, Apple Safari, Konqueror and the like that enable the user to display, with the display device 402, and to interact with images and other information typically located on a web page at a website on the World Wide Web or a local area network. Further, in one embodiment, the browser 448 may be any web browser W3C compliant to the html 2.0 standard.

In various embodiments, the user display device 402 may be a personal computer such as a desktop computer, a laptop computer and a notebook computer, a personal digital assistant, a cell phone or any other device including a processor and a display. As previously described, the display device 402 includes a display (e.g., display 104) and the browser 448 provides an image in the display.

In operation, the user may select elements for inclusion in an embroidery design where the elements include text elements and design elements which correspond to one or more of the stored images 412 that have, for example, been pre-rendered by the system 400 and stored at the file server 414. In one embodiment, one or more of the stored images 412 are transmitted from the file server 414 to the browser 448 when the corresponding embroidered element is selected by the user. The stored images that are received at the display device 402 may be cached in the browser cache 450 to allow the user to render one or more different designs that include the stored image without the need to request another rendering of the embroidered element or elements from the host system 406. For example, where the web page is programmed in HTML, the ability to retain the stored images 412 in the browser cache 450 eliminates the generation of, for example, a "http get request" command that would otherwise result in more than one exchange of information between the user display device and the host system 406 before a selected-design can be rendered.

For example, assuming that a user is choosing between two stock design or text elements based on appearance, a separate image of each element is stored on the browser cache 450 when selected by the user in accordance with one embodiment. The user can then view a plurality of designs which mix and match the stored images 412 that are cached in the browser cache 450 using information that is local to the user display device 402. That is, the display of a first design with a first stock text element (e.g., text in "block" format) can be followed by the display of a second design with a second stock text element (e.g., the same text in "script" format) without the need to request information from the host system 406.

In various other embodiments, the stored images and/or selected embroidery design can be transmitted to user via email for their review/selection. Thus, in one embodiment, the embroidery design is included as a file attached to a message transmitted to the user for review on the display device. In a version of this embodiment, the user also communicates their selection of an embroidery design via email.

The caching of various stored images 412 at the browser cache can be implemented in a variety of ways. For example, where stock text is available in "text families" or "sets" (that is, block lettering in font 10, block lettering in font 12, script lettering in font 10, script lettering in font 12, etc.) a set or family including each letter of the alphabet for a particular family may automatically be transmitted to the browser 448 and stored in the browser cache 450 when the user selects a first text element included in the set. The sets may also included a plurality of colors pre-rendered for each of the letters of the alphabet to provide for automatic caching of not only each letter for a particular font but each letter in a plurality of commonly selected colors in the font.

Stock design elements may be pre-rendered and stored among the stored images 412 for later transmission to user display devices (e.g., the display device 402) in a similar manner. For example, a plurality of images each corresponding to a stock design in a different color/color combination, respectively, may also be among the stored images 412 where they can automatically be transmitted to the browser 448 and stored in the browser cache 450 when the user selects the stock design in any one of the colors. Here too, the system 400 reduces and/or eliminates the need for the display device 402 to transmit a plurality of information requests to the host computer 406 when the user is comparing a plurality of designs.

The result of the above approach is also advantageous because both text elements and design elements can be selected and modified by a user at the display device without the need for the host system 406 to render images real-time. It should be apparent to those of ordinary skill in the art, that such an approach streamlines the ordering process from the viewpoint of the user (the process is quicker) and may reduce the processing requirements of the host system 406.

Figure 5:
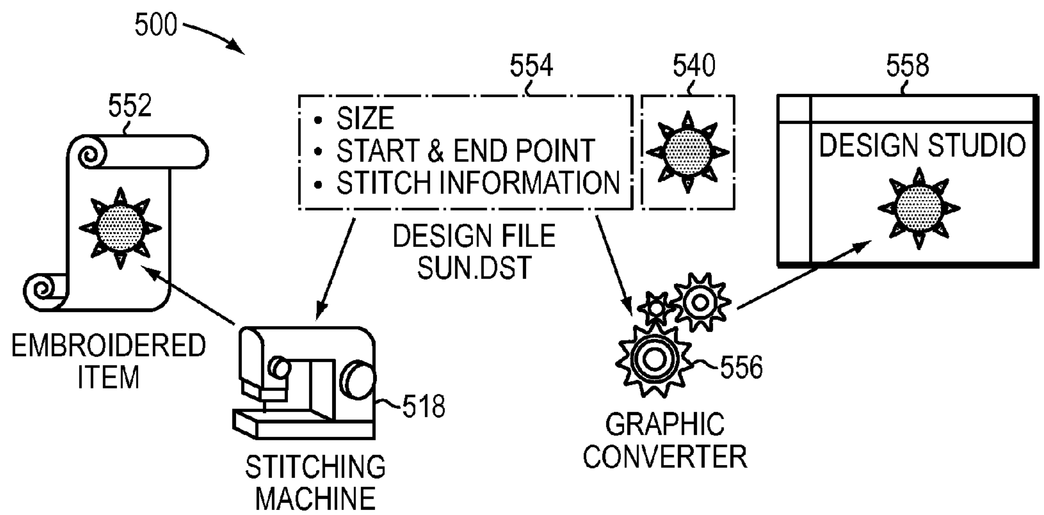
FIG. 5 illustrates elements of a system for producing an embroidery design in accordance with one embodiment of the invention.

Referring now to FIG. 5, a block diagram of a system 500 for stitching an embroidery design selected by a user using a design studio is shown in accordance with an embodiment of the invention. In one embodiment, the system 500 includes a graphic converter 556 that can be employed to render images corresponding to a stitched element 540, for example, a stock design element of the sun. Further, the graphic converter 556 can be used to pre-render the image of a plurality of stitched elements. The system 500 may also include one or more stitch files 554, a stitching machine 518 and a design studio 558. In general, the system 500 can operate to allow a user to select an embroidered design using the design studio where the system stitches the embroidered design on an item 552 which may also be selected by the user. According to one embodiment, the design studio 558 is displayed in a display of the user's display device.

In one embodiment, the stitch file 554 (e.g., SUN.DST) includes the instructions for stitching a design element (e.g., the sun) to which it corresponds. For example, the stitch file may include information concerning the size (e.g., the dimensions) of the design element, a start point (e.g., an x-y coordinate) where the stitching should begin, an end point (e.g., an x-y coordinate) where the stitching should end, and stitch information. In a further embodiment, the stitch file 554 includes the XY coordinates for each stitch and stitch type. One embodiment includes at least three stitch types: a regular stitch; a jump stitch where the needle doesn't actually penetrate the fabric; and, a color change command. In addition, some embodiments may include at least one hybrid stitch, for example, a stitch that includes two jump stitch commands on top of each other (e.g., repeating the same x-y coordinates in succession). In one version, this hybrid stitch provides a trim stitch where the machine automatically trims the thread before going on to the next stitch.

The stitch file 554 may be a digital stitch file, for example, the following types of stitch files Tajima.DST, Barudan FMC, Barudan FDR, Melco expanded, Melco Condensed, Brother Toyota or Happy. The stitch file 554 is supplied to the stitching machine 518 where the design element 540 is stitched on the item 552. As mentioned previously, the stitching machine 518 may include one or a plurality of stitch heads. In addition, the stitch file 554 may be supplied to the stitching machine 518 over a wide area network, a local area network, a magnetic storage medium such as a disk, and the like.

The design studio 558 may be any design studio that can be displayed at a display device (e.g., display device 104) to allow the user to select and customize an embroidery design. In one embodiment, the design studio is a web-based design studio that is displayed in a web browser. In a version of this embodiment, the design studio 558 is programmed in a combination of HTML and may also include screens rendered using JAVA, Java applets, and/or JavaScript. For example, the web design studio may provide a user with JavaScript-based forms that are completed during the ordering process. In various embodiments, the design studio may be programmed with languages such as JSP, VBscript, ASP, ASP.NET, and/or PHP.

Figure 6:
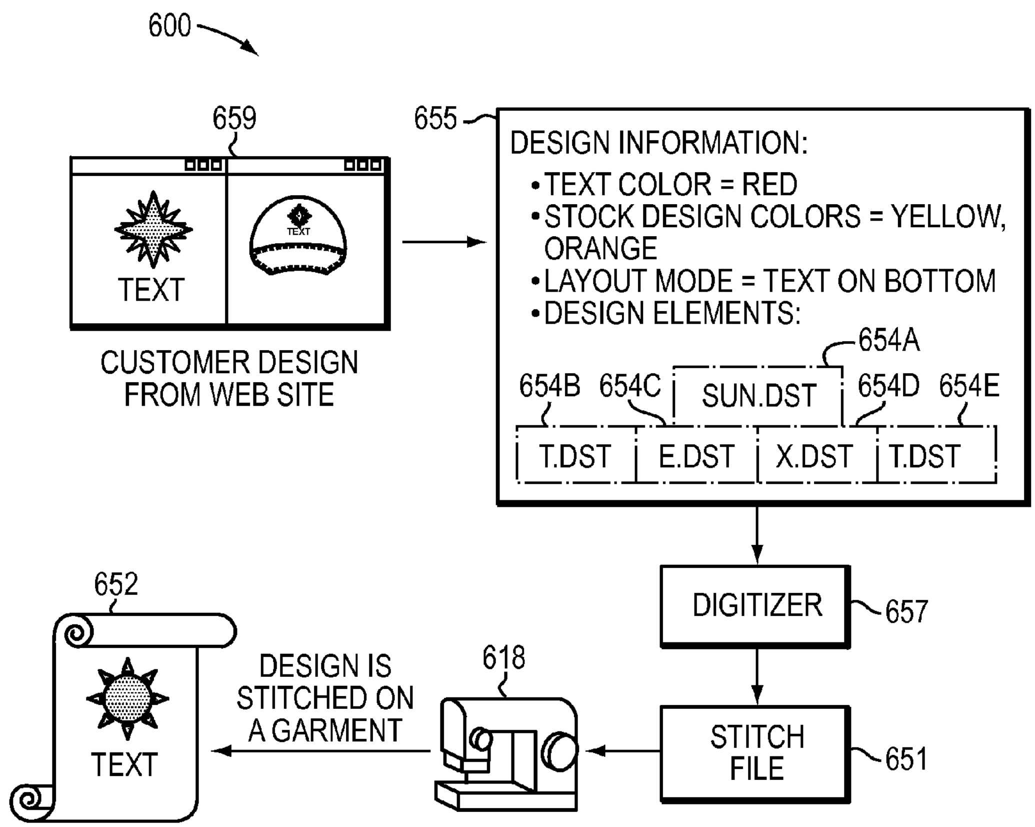
FIG. 6 illustrates elements of a system for producing an embroidery design in accordance with a further embodiment of the invention.

Referring now to FIG. 6, a block diagram of a system 600 for generating a custom embroidery design including one or more embroidered elements is illustrated. In one embodiment, the system 600 includes a user selected embroidery design 659, design information 655, a plurality of individual stitch files 654A, 654B, 654C, 654D, and 654E, a digitizer 657, a stitching machine 618 and an embroidered item 652. In general, according to one embodiment, the digitizer 657 can generate a single stitch file 651 (e.g., a composite stitch file) from the design information where the stitch file corresponds to each element included in the user selected embroidery design.

According to one embodiment, the user selects an embroidery design 659 that in various embodiments may include a single embroidered element or a plurality of embroidered elements. The embroidered elements may be selected using pre-rendered images of text elements, design elements (e.g., shapes, symbols, etc.), newly created elements or a combination of two or more of the preceding. For example, the user may select a "sun" as a design element with four text elements appearing beneath the design element. Further, the user may select an item (e.g., a hat) and locate the entire embroidered design at a specific location on the hat.

In one embodiment, the embroidered design selected by the user is received by the host system where the selected design is associated with the design information 655. For example, the design information 655 may include a color of the text, a color of the design element, and a layout of the embroidered design (e.g., the location of the text element relative to the location of the design element and/or relative to the stitching region). In addition, the design information 655 can include a separate stitch file (e.g., stitch file 654C) which corresponds to each of the selected elements, respectively, included in the design. For example, if a single embroidered element (e.g., the "sun" design element) is selected for the embroidered design 659, then a single stitch file (e.g., SUN.DST) is included in the design information 655. Similarly, if the "sun" design element and the word "TEXT" are included in the embroidered design 659, the design information 655 includes five stitch files—one each corresponding to the "sun" design element and each of the four letters that make up the word “TEXT.” As is seen from this example, according to one embodiment, a separate stitch file is included for each letter.

According to one embodiment, the system 600 may include a design studio that allows the user to select embroidered elements by selecting one or more pre-rendered images of the elements included in the design. Further, as described above, in various embodiments, the system 600 can include a graphic converter that generates a pre-rendered image of each of the embroidery elements that are available via the design studio when the user selects their design. Thus, an image corresponding to each of the stitch files 654 can be available to the user when the system 600 is employed. It should be apparent to those of ordinary skill in the art that copies of a single cached image corresponding to one of the selected elements may be employed at a plurality of locations in the embroidered design when viewed by the user. For example, the word “TEXT” includes two letters “T.” As a result, a pre-rendered image of “T” may appear at two locations within the embroidered design that is presented to the user in the design studio. In other words, the cache may include a single image that can be copied and presented in a plurality of locations selected by the user.

Where a plurality of stitch files are included in the selected embroidery design, the system 600 can convert the stitch files 654 corresponding to each of the plurality of embroidery elements into the single stitch file 651, for example, the composite stitch file referred to above. The stitch file 651 may for example, include information corresponding to the size of each element, the start point and end point for each element, the color of thread to use for each element or portion thereof, and additional stitch information. In accordance with one embodiment, the single stitch file is compiled from the stitch files 654. Thus, in some embodiments, a single stitch file is compiled from a plurality of stitch files. In a further embodiment, the conversion process occurs automatically, i.e., the conversion is completed using an auto-compiling process.

The system 600 may also include an order server 108 and a rules engine 110 where either or both of the order server and the rules engine are employed to receive the design information 655 for the embroidery design selected by the user and convert the design information into the stitch file 651. In accordance with one embodiment, the rules engine 110 adjusts the spacing of the selected text elements (e.g., “TEXT”) to account for the movement (e.g., displacement) of the material caused by the stitching process. In a version of this embodiment, the rules engine 110 also adjusts the spacing of the selected text to account for a human perception of the embroidered design when stitched. According to one embodiment, the spacing can be a spacing in any direction adjacent the text element, for example, in a direction to the left, the right, above, or below the text element. In a further embodiment, the stitch file 651 is generated by an auto-compiling system that adjusts the spacing of text elements included in the embroidery design according to a set of rules provided by the rule engine 110. In a version of this embodiment, the auto-compiling results in a stitch file 651 that does not require review by an embroidery designer or machine operator before being stitched by the stitching machine 618.

Figure 7A:
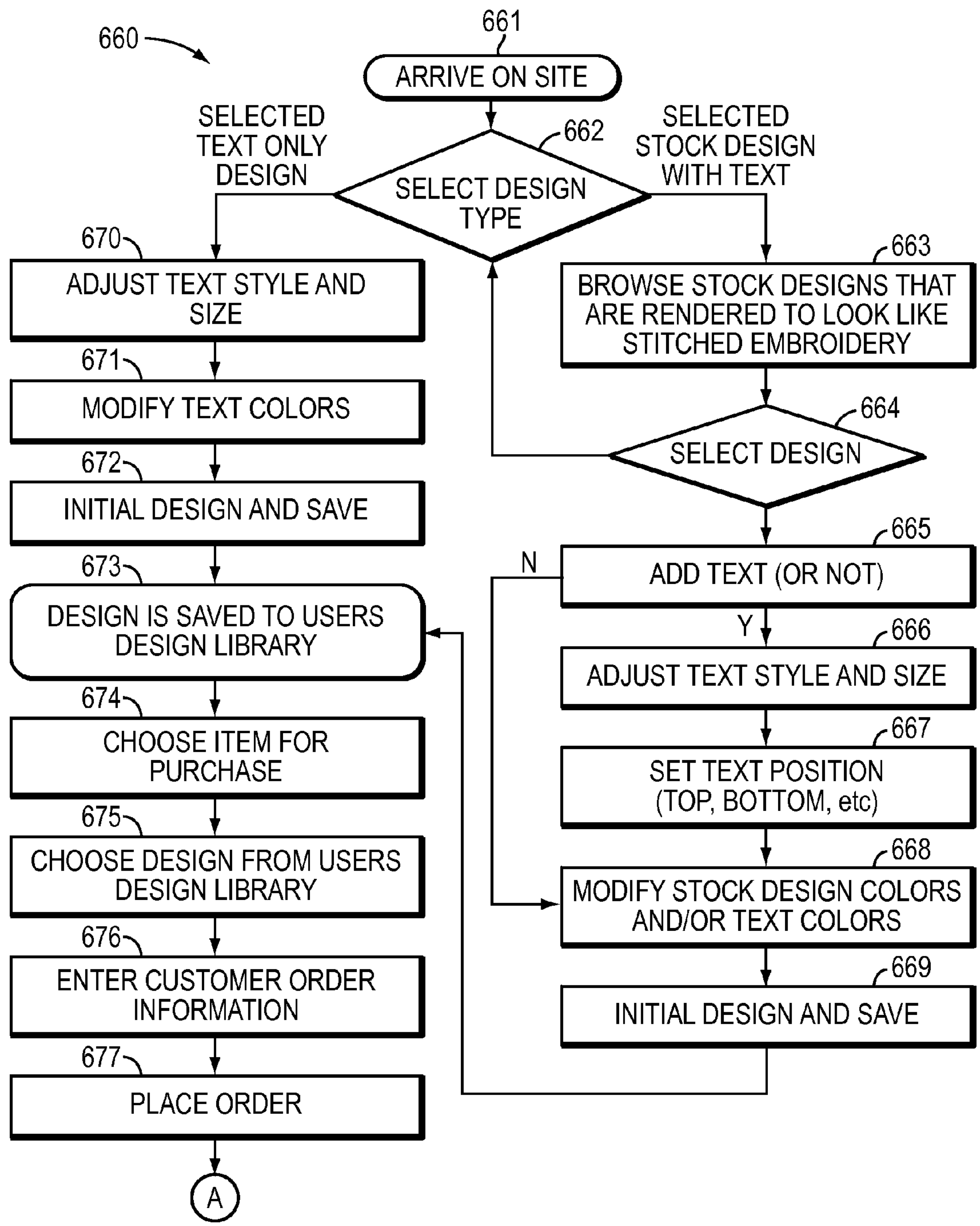
FIGS. 7A and 7B illustrate a process for placing an order for an embroidery design in accordance with one embodiment of the invention.

Referring now to FIG. 7A, a process 660 for selecting and ordering an embroidery design is illustrated in accordance with one embodiment. According to one embodiment, the process is accomplished via a wide area network, e.g., the Internet. At Stage 661, a user connects to the website served by the host computer (e.g., the computer 106). In one embodiment, the user employs a web browser to access the website. At Stage 662, the user selects either an embroidery design including stock designs and text, a text-only embroidery design or a design-element only design.

When the user selects a stock design and text, at Stage 663, the user browses a plurality of stock design elements that are rendered to look like stitched embroidery. At Stage 664, the user selects a design element from among the available stock design elements. The user may either browse through established categories and sub-categories or search for a specific design. According to one embodiment, the process 660 returns to Stage 662 when the user decides to run a search. At Stage 665, the user adds the desired text elements to the embroidery design and proceeds to Stage 666, or alternatively, if they have decided against using text in the embroidery design they proceed to Stage 668. Here too, any selected text elements are added to the design in a manner where they are rendered to look like stitched embroidery. Provided that the embroidery design includes text elements, the user adjusts the style and size of the text elements at Stage 666. At Stage 667, the user adjusts and sets the text position.

The colors included in both the stock design element(s) and the text element(s) are changed, if desired, at Stage 668. For example, pre-rendered images provided to the display device may be employed at Stage 668. At Stage 669, the user saves the selected embroidery design.

Returning again to Stage 662, if the user selects a design that only includes text elements, they proceed to Stage 670 where they can adjust the text style and the text size. At Stage 671, the user modifies the color of the text. At Stage 672, the user saves the design.

As mentioned previously, a user's custom embroidery designs can be saved on the host computer 106. At Stage 673, the design selected at either Stage 669 or Stage 672 is saved to their personal library located on the host computer.

According to one embodiment, an order is finalized at Stages 674-676 when the customer selects a garment where the embroidered design will be stitched (i.e., at Stage 674), selects the embroidery design from their design library at Stage 675, and enters customer information at Stage 676.

At Stage 677, the user orders the embroidered item or item. According to one embodiment, the order is transmitted from the user device 102 over the network 132 to the host computer 106.

Figure 7B:
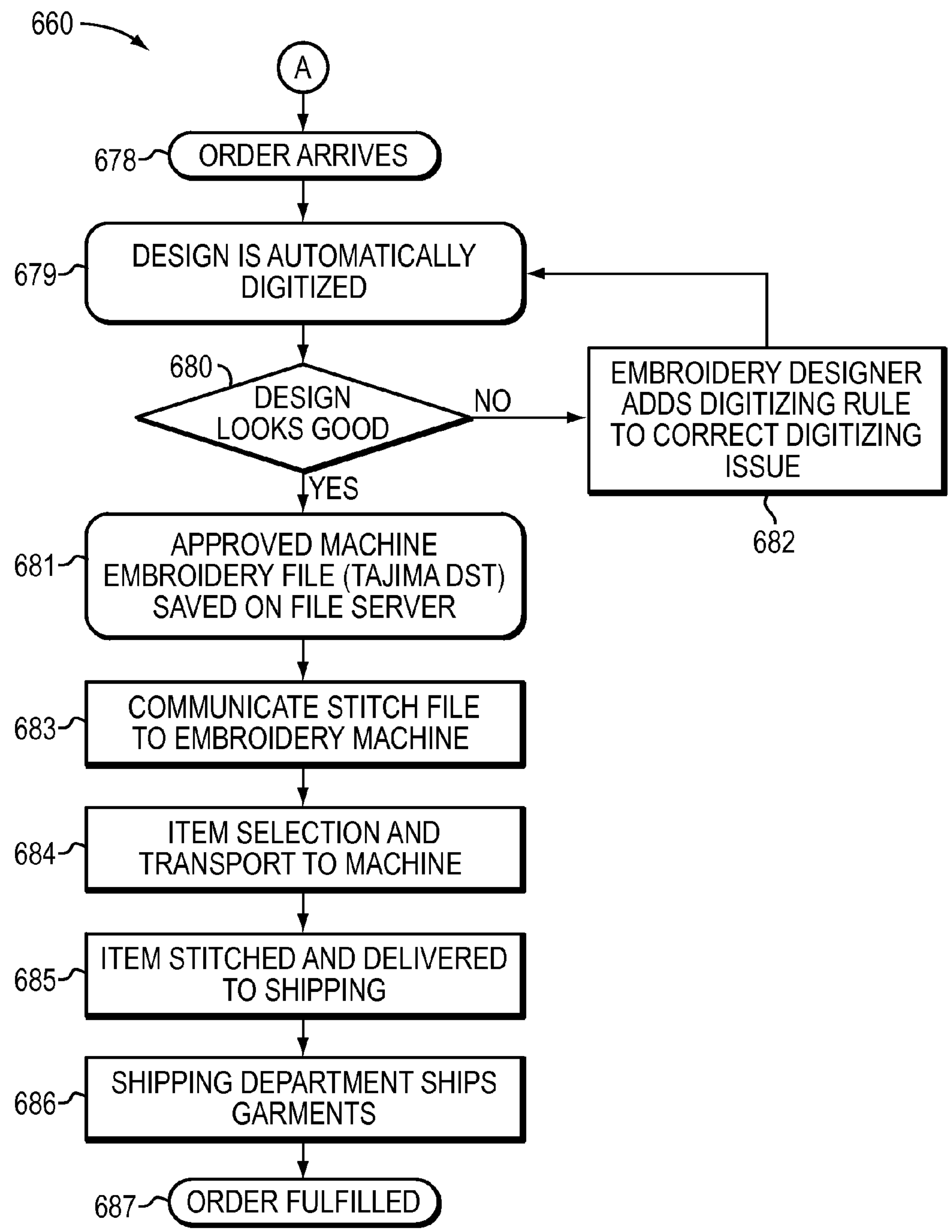

FIG. 7B illustrates a portion of the process 660 where the order is received and executed. The order is received by the host computer 106 at Stage 678. According to one embodiment, the order includes information that identifies each of the respective elements included in the embroidery design selected by the user. That is, as described previously, the user may have selected the design using graphic images previously generated from the digital stitch files that represent each of the respective text elements and design elements. Thus, in a version of this embodiment, the order identifies each of the elements and their location in the stitching region. At Stage 679, a single digital stitch file is generated for stitching the selected embroidery design.

In accordance with one embodiment, at Stage 680, an image of the digitized embroidery design is reviewed by a reviewer, for example, an embroidery designer or other individual experienced with the results that occur when a digitized embroidery design is actually stitched on an item. If the embroidery designer is satisfied with the digitized version of the embroidery design, the process continues at Stage 681. If the embroidery designer finds that the digitized design is unsatisfactory, the designer may correct the design at Stage 682. For example, the spacing between a first text element and a second text element (e.g., a text element that is adjacent the first text element or elsewhere in the selected design) may have an unsatisfactory appearance. The designer may add one or more rules to correct the digitized version of the embroidery design. The order may then be re-digitized with the new rule(s). According to one embodiment, the designer adds one or more rules to the rules engine (e.g., rules engine 110). As a result, the rules engine can prevent an occurrence of similar unwanted effects for each future embroidery design that is digitized.

Further, in various embodiments, the rules can be applied to other characteristics of the text element and/or design in addition to the spacing. For example, in some embodiments, the rules adjust the dimensions of the text element when stitched relative to other text elements included in the design. That is, a height of a plurality of stitched text elements included in a design can be matched despite the adjustment of the material caused by the stitching of the various text elements.

Accordingly, in one embodiment, the rules engine includes a plurality of kerning rules including, for example, a first kerning rule to adjust a first spacing that appears between a first text element and a second text element, a second kerning rule to adjust a second spacing that appears between a third text element and a fourth text element. Additionally, a plurality of kerning rules may be associated with any single text element, for example, a first kerning rule to adjust a spacing between a first text element and a second text element, a second kerning rule to adjust a spacing between the first text element and a third text element, a third kerning rule to adjust spacing between the first text element and a fourth text element and the like. The rules engine may also include kerning rules to adjust spacing between a text element and an object (e.g., a design element).

Once the stitch file is approved at Stage 681 it can then be communicated to a stitching machine for production at Stage 683. According to one embodiment, the stitch file is transmitted to the stitching machine over a network, for example, a local area network (some examples include Ethernet networks and RS-232 based systems). In other embodiments, a wide area network such as the Internet is used, and in still other embodiments, a combination of LANs and WANs. In still another embodiment, the stitch file is placed on a storage medium such as a magnetic disk and a stitching machine operator then loads the disk into the stitching machine for production.

The production of embroidered items may also involve the selection of the item to be embroidered (i.e., an item that matches the user's selection) and transport of the item or items to the stitching machine. For example, at Stage 684, an item (for example, an item of apparel) is selected by production personal and moved to the stitching machine. Then, at Stage 685, the item is stitched with the embroidery design and then delivered to the shipping department for delivery to the customer. It will be apparent to those of ordinary skill in the art that each of Stage 684 and Stage 685 may involve multiple stages. For example, a machine operator may select the item or items for apparel and then communicate the selection to a material handler who locates the item(s) in storage and delivers them to the stitching machine where the machine operator oversees the stitching process. Similarly, the machine operator may alert shipping department personnel that an order is complete and ready for pickup at a stitching machine. At Stage 686, the user-selected embroidered items are shipped to the customer at Stage 686. Thus, the order is fulfilled at Stage 687.

It will also be apparent to those of ordinary skill in the art that the process 660 may include various combinations of stages or steps, and as a result, may include fewer stages, additional stages, or stages placed in a different sequence than that shown in FIGS. 7A and 7B. For example, Stage 676 may be occur elsewhere in the process 660 because, for example, the user may simply want to replicate a previous order or repeat a previous order with changes to one or more of the quantity of items, the color of the items, the color of the embroidered elements, and the like. In this example, some of the Stages directed to the selection process may be modified or eliminated. Additional Stages directed to quality control may also be included in the process, for example, the machine operator or other personnel may visually inspect the embroidered item after the stitching is complete.

Embodiments of the invention are also intended to include various embodiments of the process 660 that include further automation. As one example, the communication of the approved stitch file to the embroidery machine at Stage 683 may occur automatically.

Embodiments of the process 660 may also be employed in a variety of types and sizes of embroidery production processes. In one embodiment, the process 660 may be employed in a relatively large scale embroidery production operation. In another embodiment, the process 660 may be employed with a distributed home-based workforce that includes geographically distributed single stitching machines. In yet another embodiment, the process 660 is employed in a kiosk-based production environment whereby a user may select and order an item with a custom embroidery design at a kiosk that includes a stitching machine. In versions of this embodiment, the user may wait or return a short while later to pickup the embroidered item.

FIGS. 8-13 illustrate information displayed in a display of a user display device in accordance with one embodiment of the invention that employs a design studio in a web browser. FIG. 8 illustrates a menu available to the user. For example, the display 880 allows the user to select from a first selection (e.g., link) 881 where the user may upload their own logo to the design studio. In one embodiment, the user may supply an image of a logo that the system (e.g., the system 100) can convert to a stitch file, and then convert the stitch file to an image that can be among the stored images available to the user for inclusion in custom embroidered designs any time in the future. In a version of this embodiment, a digitized design is manually created and uploaded to the design center where it may be viewed by the user for future orders and/or to add text elements (e.g., alpha numeric characters) to the design. The user is also provided with a second selection 882 where the user may access images of stock designs and text, and a third selection 883 where the user can only select embroidered text, i.e., design elements cannot be incorporated to embroidery designs with the third selection 883.

Figure 9:
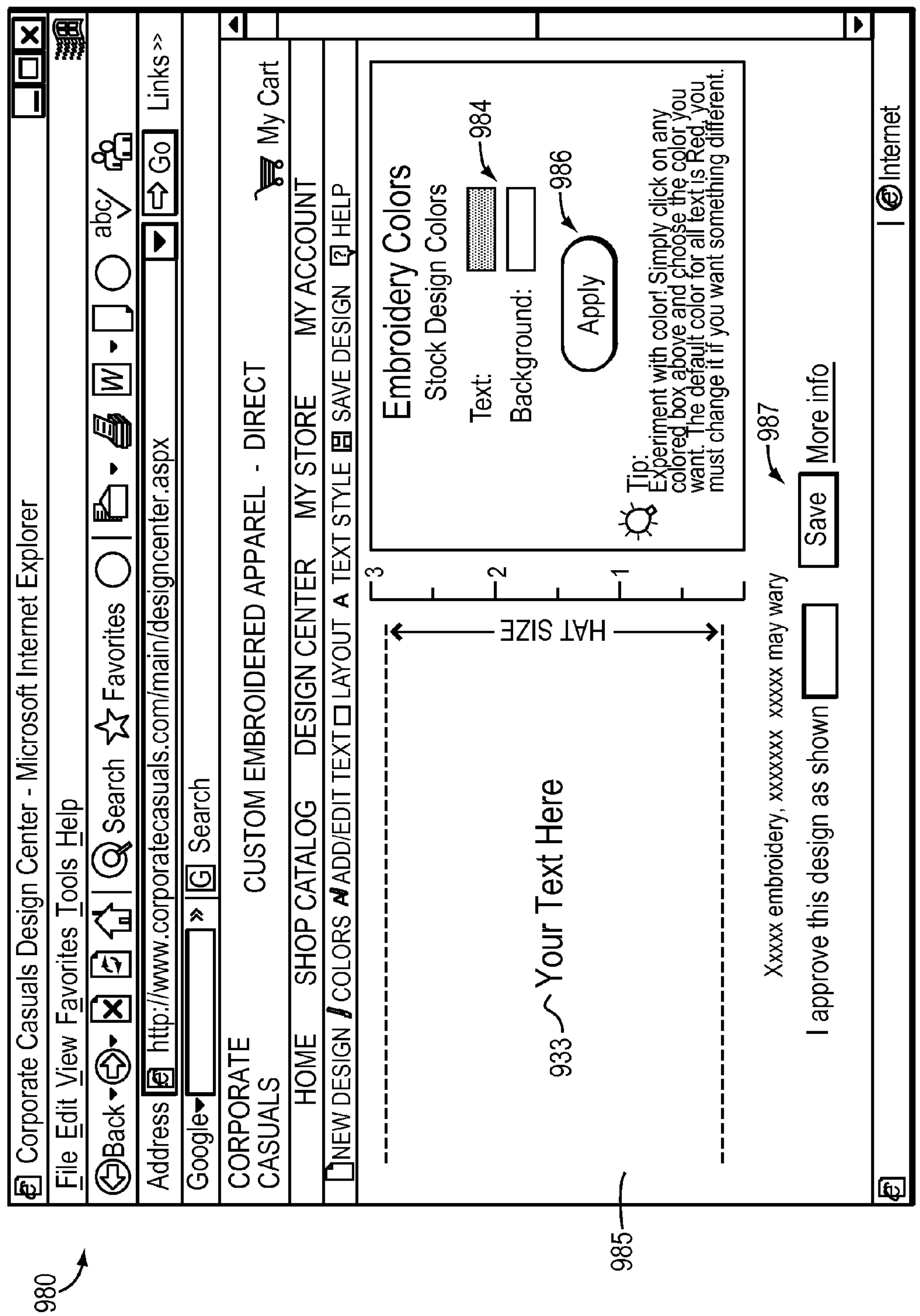
FIG. 9 illustrates another display employed to select an embroidery design accordance with one embodiment of the invention.

Once the user selects the design type using the menu provided in the display 880, the system can present an image of the stitching region 985 in the display 980 of FIG. 9. In addition, the display 980 may also include design selections 984 that the user can review and change to modify the image of the embroidered design in the stitching region 985. In one embodiment, the design selections 984 can allow the user to experiment with the visual impact and suitability of various color combinations by changing the color of the selected text elements, design elements and/or the color of the material that was selected for stitching. Further, various control buttons 986, 987 may also be included in the display 980. For example, the control buttons 986, 987 can allow the user to change the settings (e.g., color settings) and/or accept an embroidery design. In one version, information displayed in the display 980 results from the user selecting the third selection 883 (e.g., a text only design) where user-selected text elements 933 are displayed in the stitching region 985.

Figure 10:
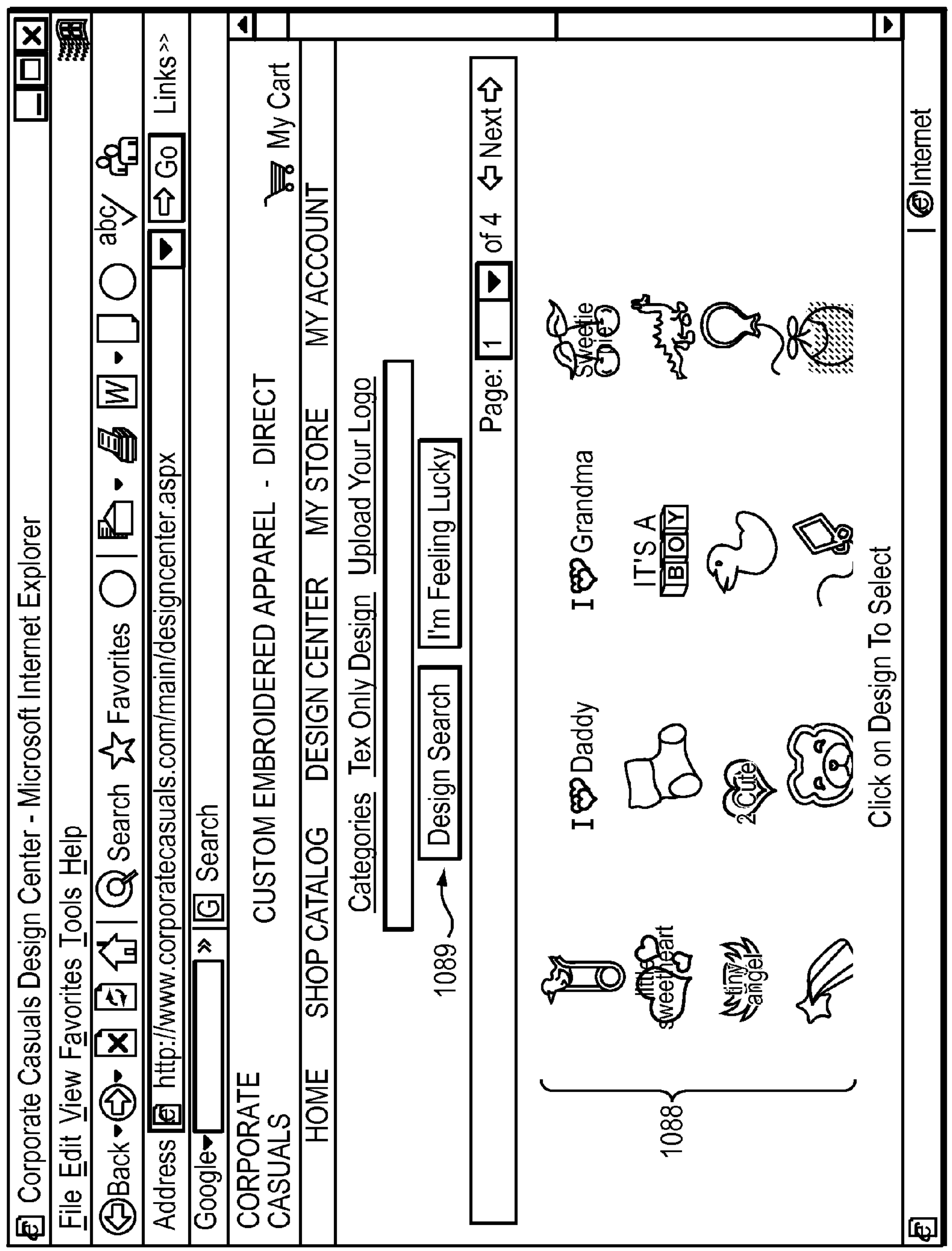
FIG. 10 illustrates a further display employed to select an embroidery design in accordance with one embodiment of the invention.

Referring now to FIG. 10, the design studio can display one or a plurality of images of stock designs 1088 in the display 1080. Generally, the stock designs are selected for their popularity and/or suitability for use in a wide variety of embroidery designs. In addition, the stock designs may be limited to designs for which the operator of the host system has the rights (e.g., copyright). Here too, one or more control buttons 1089 may be provided as part of the design studio in the display 1080. For example, a control button 1089 may assist a user in searching for a specific type of design element (e.g., an apple, the sun, etc.) or otherwise controlling the selection process. As illustrated among the design elements 1088, a design element may include only an object or an object (e.g., a heart) combined with one or more text elements. According to one embodiment, each of the design elements 1088 may be presented as an image of an embroidered version of the design element. Further, in one embodiment, images can be stored images that were previously rendered by the host system.

Figure 11:
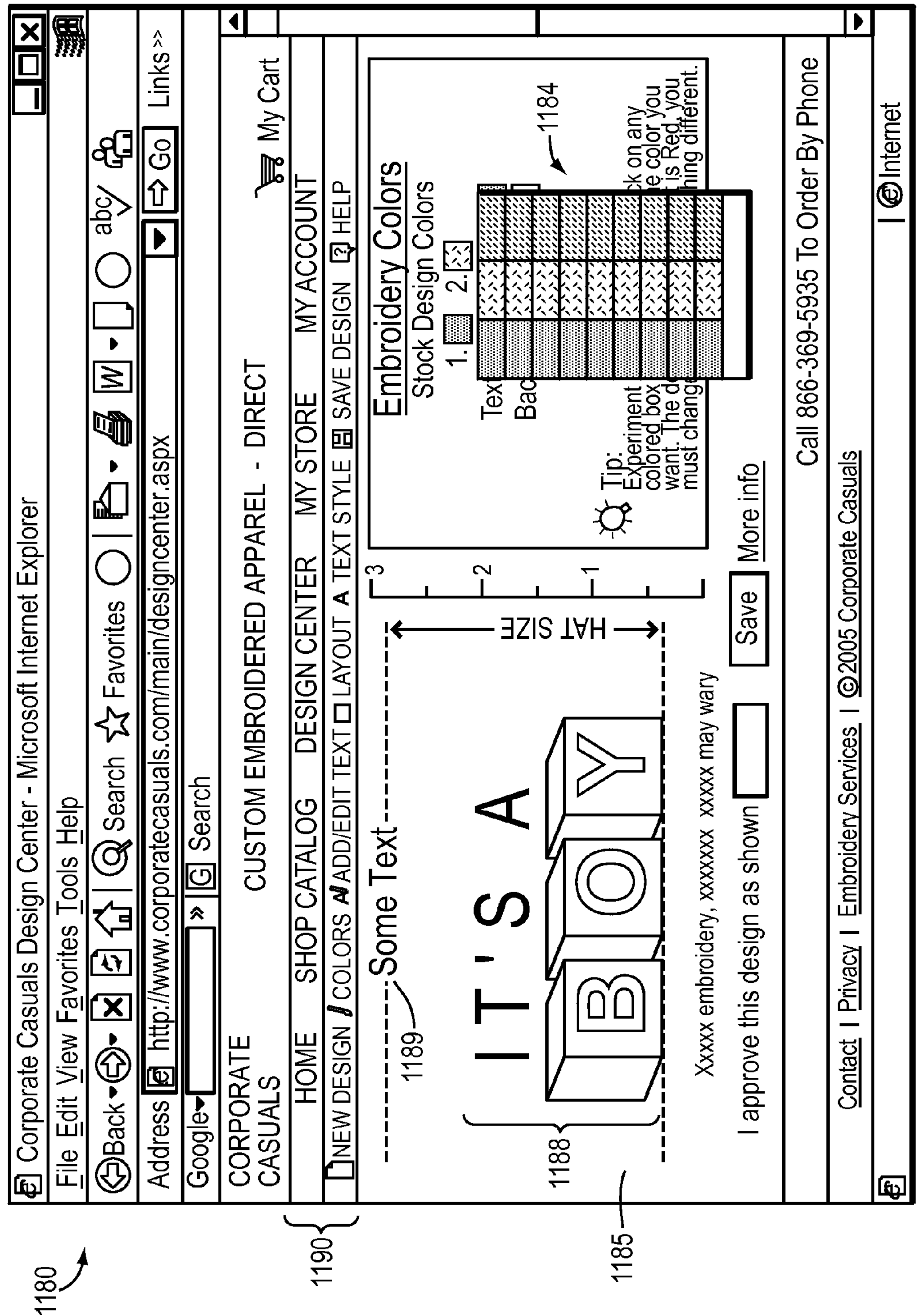
FIG. 11 illustrates a display employed to customize a selected embroidery design in accordance with one embodiment of the invention.

Referring to FIG. 11, once a user has selected a design element 1188 for their embroidery design, the design element can be presented by the design studio in a display 1180 within an image of a stitching region 1185. Further, whether or not the selected design element includes text, the user may have an option to add one or a plurality of text elements 1189 to the embroidery design. In a further embodiment, the display 1180 includes one or more design selections 1184 that the user can manipulate to modify the image of the embroidered design including design elements and text elements in the stitching region 1185. The design selections 1184 can include one or more "pull-down" features that provide a plurality of design selections to the user.

As should be apparent to those of ordinary skill in the art, the design studio may also include in the display 1180 a wide variety of control elements in addition to or in combination with buttons and pull down menus. For example, the display 1180 may include a plurality of additional control elements 1190 that facilitate the selection, editing and customization of an embroidery design. In one version, the design studio can include links to a user's account information or order status.

Figure 12:
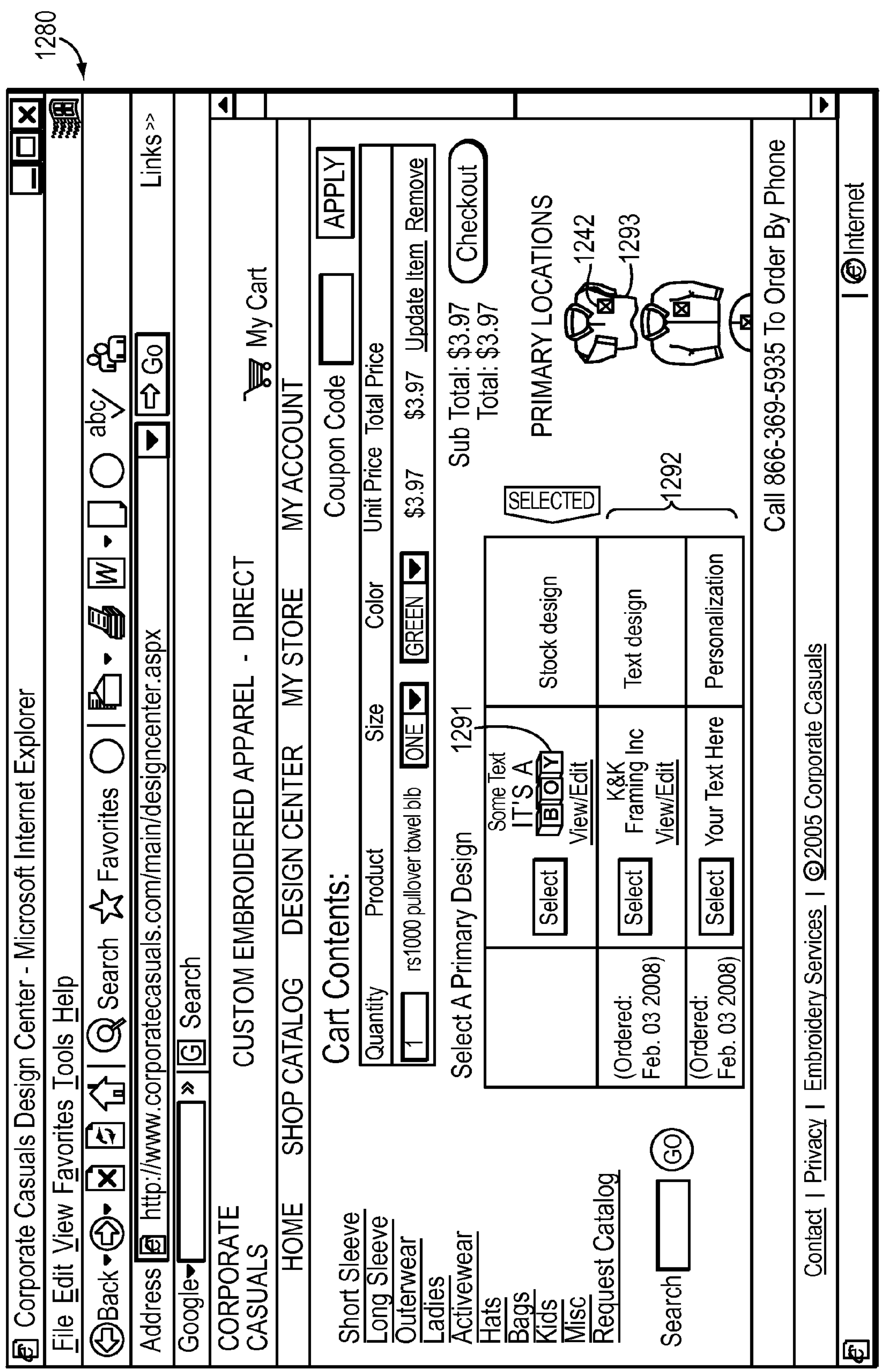
FIG. 12 illustrates a display employed to order an embroidery design in accordance with one embodiment of the invention.

For example in FIG. 12, a display 1280 includes details concerning the current design or designs that are being ordered 1291, and one or more previously selected and/or ordered designs 1292. The display may also include an image of the selected garment or other item 1293 including an identification of the stitching region 1242 on the item. In various embodiments, the user can proceed through a checkout process, for example, an on-line checkout process that is familiar to those of ordinary skill in the art.

For example in FIG. 13, a display 1380 includes a user's contact information 1394, billing information 1395, and shipping information 1396. Where the system 100 provides personalized user accounts the preceding information may be gathered when an initial order is taken for a user and saved for later use in the processing of subsequent orders or order-status inquiries.

As mentioned above, embodiments of the system 100 can provide for the generation of a single stitch file corresponding to the embroidery design selected by the user. According to one embodiment, the stitch file is generated after the user places an order for the design. In a version of this embodiment, the generation of the stitch file occurs automatically when the host computer 106 receives the order for the embroidery design.

Further, in various embodiments, the system 100 can provide a process for generating a stitch file that improves the quality of the embroidered design when stitched on an item. As mentioned previously, the host computer 106 may include a rules engine 110 to apply one or more rules during the generation of the stitch file. The rules engine 110 can, for example, be a rules module provided in the software operating on the host computer 106.

Also, as described with reference to FIG. 7B and act 680, the system 100 can provide a review step or process that allows an embroidery designer or other individual to review an image of the embroidery design (e.g., a 3D image) and modify the stitch file to improve the quality of the embroidered design. That is, the embroidery designer reviews the image of the embroidered design resulting from the stitch file that is generated from the user's order. The embroidery designer determines whether the characteristics of the design (e.g., character spacing, relative size of objects and text, etc.) achieve the expected result in view of the design selected by the user. Additional characteristics such as the spacing between objects and text, and the overall size of a design relative to the size of a garment to which it is to be stitched may also be considered. Further, as described in the example provided by act 682 in FIG. 7B, the embroidery designer can adjust the characteristics that do not have an appearance quality that would be desired by the user.

Figure 14:
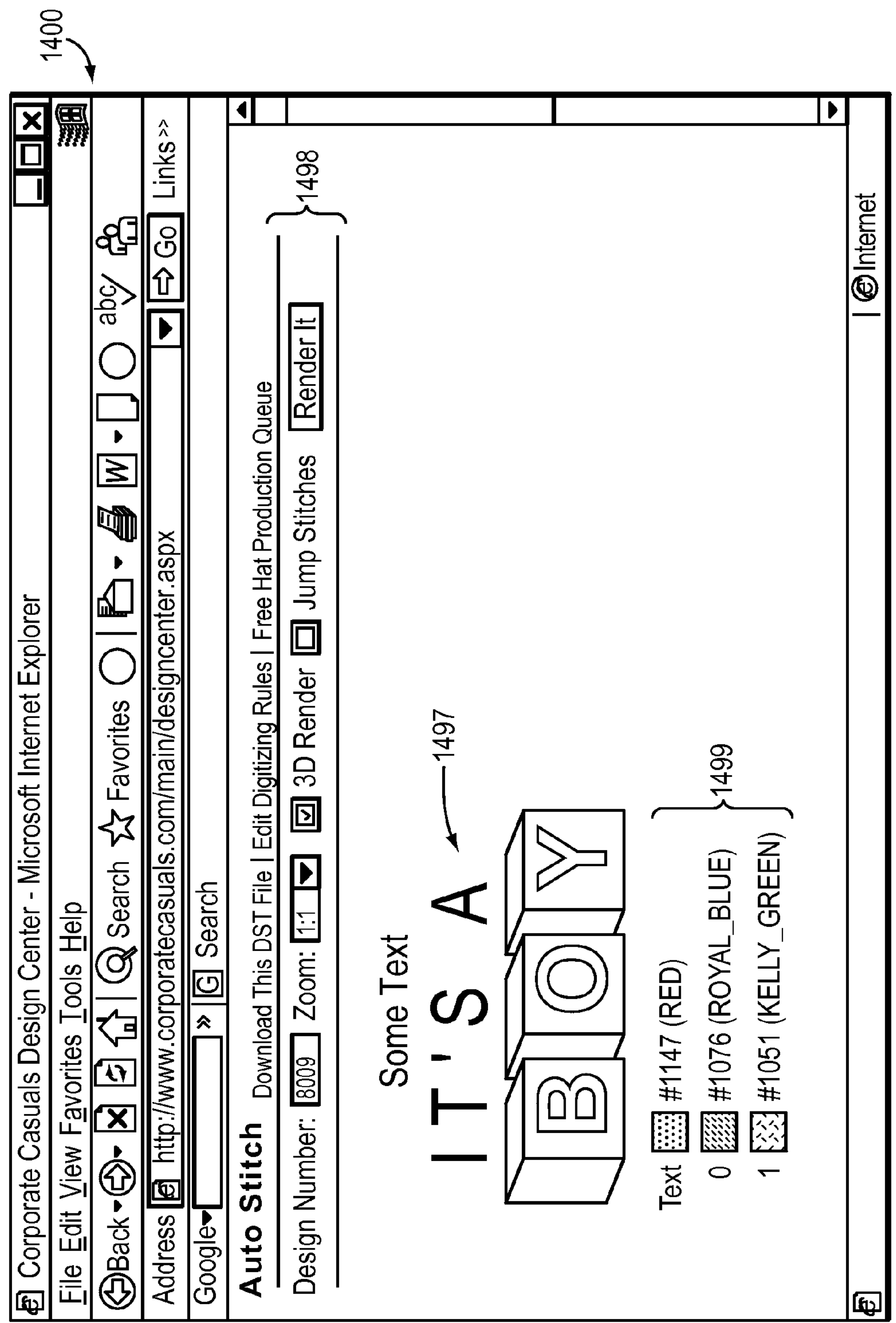
FIG. 14 illustrates a display that can be employed to review an embroidery design in accordance with one embodiment of the invention.

According to one embodiment, the embroidery designer may review the image resulting from the stitch file of the selected embroidery design and revise the design using the interface 116. For example, a display 1400 in FIG. 14 illustrates one embodiment that provides an image 1497 of a selected embroidery design which is a graphic image of a user selected embroidery design. In one embodiment, the image 1497 is presented in the display 1400 following the generation of a stitch file corresponding to the user selected design, for example, the generation of a composite stitch file (e.g., the composite stitch file 651). That is, in one embodiment, the user selects an embroidery design using a plurality of graphics files each representing an element of the embroidery design. The user orders the selected design and transmits the order to the host computer 106 where the selected design is converted into a stitch file that provides instructions for a stitching machine to stitch the selected design. In one embodiment, the image 1497 is the result of a graphics conversion of the composite stitch file corresponding to the embroidery design selected by the user. Thus, because the image 1497 results from a graphics conversion of the actual instructions that will be used by the stitching machine, the image 1497 represents the appearance that the selected design will have when embroidered on the item selected by the user.

The display 1400 may include a variety of control elements 1498 and indicia 1499 to assist a reviewer during the review process. For example, the control elements 1498 may allow the reviewer to select the design, adjust the magnification, generate a 3D image of the design, and show the location of jump stitches employed in the design. Further, the indicia 1499 may provide information concerning the selected design, for example, the color or colors of the various embroidery elements. The reviewer may review the image 1497 and make adjustments to improve the quality of an embroidered design. That is, an embroidery design that, when stitched, has an appearance on the item that is anticipated by the user. The user's expectations may be established when they review the design during the selection process, for example, using the design studio to review a 3D rendering of the stitched design. In one embodiment, the system 100 employs a process that results in the production of high quality embroidered designs despite the challenges found in matching an appearance of actual embroidered item with the appearance of the item as displayed during the selection process.

Figure 15:
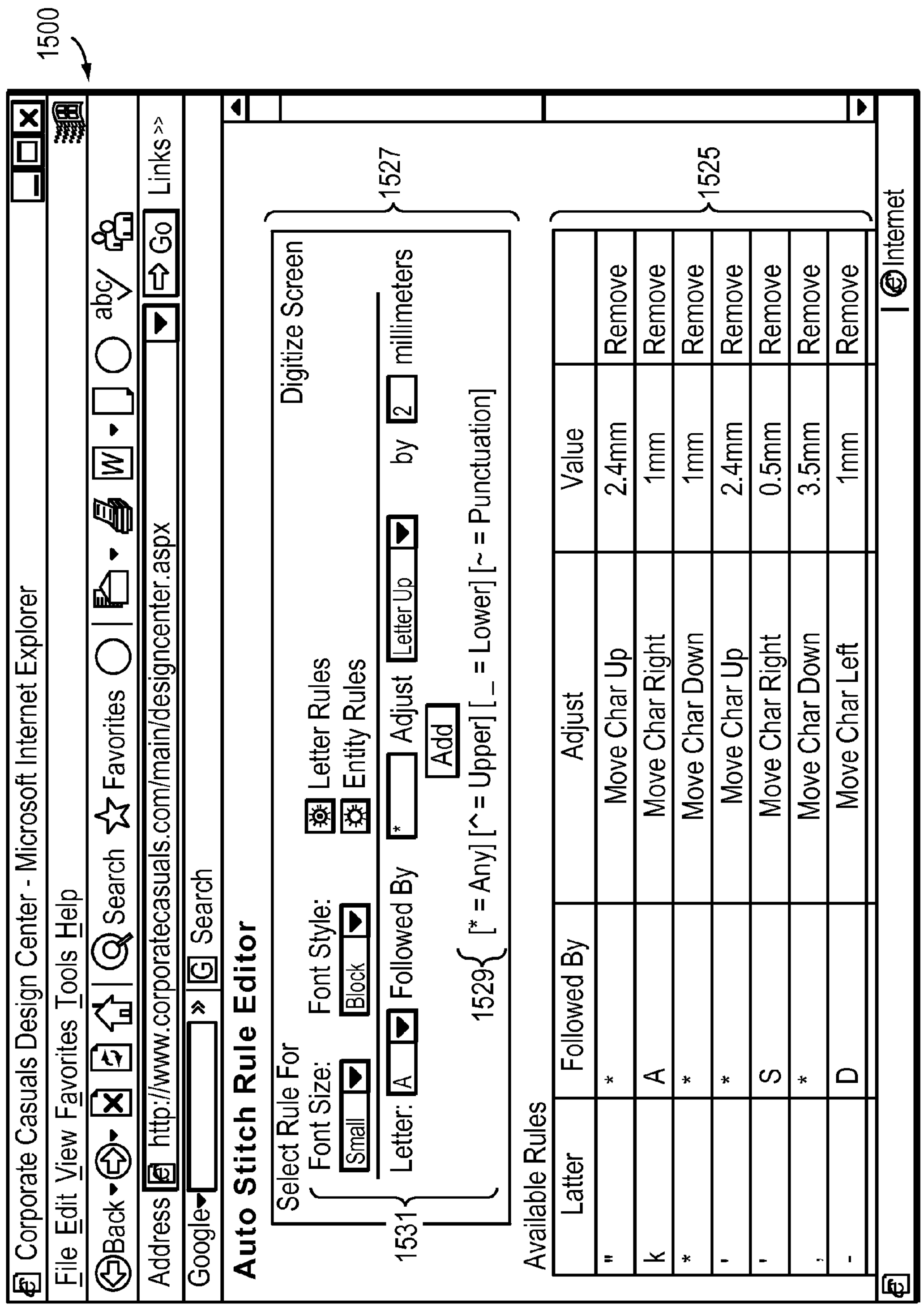
FIG. 15 illustrates a display that can be employed in an embroidery system, for example, in combination with a rules engine in accordance with one embodiment of the invention.

The system 100 may be further improved by the application of one or more rules, e.g. stitching rules, during the conversion of a user's order to a stitch file. Referring to FIG. 15, the system 100 may include a display 1500 that allows the embroidery designer (or any other qualified individual) to make changes necessary to improve the embroidered design, for example, by correcting/improving items identified during review of the image 1497. According to one embodiment, a rules engine is employed which applies one or more rules to an embroidery design selected by a user, for example, during the act of generating the stitch file for the embroidery design (for example, during the process of generating a composite stitch file including all the elements of the embroidered design). In one embodiment, the stitch file that is generated is a digital stitch file and the process of generating the stitch file is a digitization process. In one version of this embodiment, the digitization is a compiling digitization process, for example, a compiling digitization process performed at act 679 illustrated in FIG. 7B. According to one embodiment, the compiling digitization process plots the stitches required to complete each of the elements included in the embroidery design selected by the user.

In various embodiments, the rules engine can be employed to apply rules at other points in the selection and order process. These rules may be saved and applied to future orders. According to some embodiments, the rules are saved and applied to all future orders regardless of whether the order includes the specific design for which the rule was generated or a new design.

The display 1500 can allow the review of each of a plurality of rules 1525 where each rule can be employed to adjust a feature of an embroidery design. According to one embodiment, all the rules in a set of rules are automatically applied during the process of converting a user selected embroidery design into stitching instructions, i.e., into a stitch file. For example, when converting the design information 655 into the stitch file 651.

The display 1500 can also include a rules editor that includes indicia 1529 and control elements 1531 that assist the embroidery designer in selecting and revising an existing rule and/or generating and adding a new rule to a set of rules. According to one embodiment, the rules editor is included in the rules engine 110 of the host computer 106. In various embodiments, sets of rules 1525 can be organized for application to only some of the embroidery elements (either text elements or design elements). For example, a rule can be generated for application to only lower case text, or only upper case text. Other rules may be employed to a specific stock design or a set of stock designs, for example, stock designs having some similarity to each other. That is, where the stitching of a solid-color circular object causes an "inward" pull of material in a stitching region, a rule may apply to each design element that includes a solid circular element.

Concerning the stitching of text, the rules editor allows the review of the plurality of rule 1525 that apply to text, and in particular, to the spacing of text characters. For example, the embroidery designer may review a 3D rendering of an image of the user selected design and determine that adjustment should be made to correct for the effect of the stitches on the material in the stitching region and/or the perception of the spacing of the stitched text by a human who views the design. The designer can employ the rules editor 1527 to modify the rule, if one already exists, to improve the appearance of the embroidered design by correcting for imperfections in the appearance of the selected design. If, for example, the spacing between an "A" and a "V" is established by an existing rule (e.g., a spacing of 1 mm) and the designer finds that the spacing is excessive in view of the appearance of an embroidered item (i.e., the appearance of the image 1497), the designer may modify the rule to adjust the spacing. A new stitch file corresponding to the user selected design (i.e., as provided by the design information 655) can then be created using the revised rules. The embroidery designer may then review an image (e.g., the image 1497) corresponding to the new stitch file to determine if any additional adjustment is necessary, e.g., during the re-digitization process. The process can be repeated as required to generate a high quality embroidered design.

In addition to the immediately preceding approach for modifying existing rules, the rules editor 1527 may be employed to generate new rules. For example, an embroidery designer may find that two text elements appearing next to one another in a particular order require adjustment. If no existing rule is in place, the embroidery designer may add a rule for that situation using the rules editor 1527.

The preceding approach can be used to establish a plurality of rules to adjust a spacing of a first text element followed by a second text element for a plurality of combinations of text elements. The rules can establish an amount of adjustment for a given text combination and a direction of adjustment, for example, movement of a character up, down, left or right for each combination, respectively. Further, where an auto-compiling process is employed the rules may be automatically applied by a rules engine, for example, a rules module.

The above described approach allows the rules engine 110 of the system 100 to be "educated" or "trained" to improve the performance of the system over time. That is, as each rule is added to the plurality of rules 1525 the rules engine has at least one additional design feature that it can automatically correct for. Over time, the quantity of rules may increase to address most every design feature that can be included in an embroidery design, or at least, employed in an embroidery design using embroidered elements selected from among existing design elements and text elements, e.g., stock designs. Further, each rule may be refined and improved over time through its repeated application to an increasing quantity of embroidery designs and its subsequent review by designers who are reviewing each design. Ultimately, the rules engine may provide a high enough degree of accuracy that manual review by an embroidery designer becomes unnecessary, for example, review of the image 1497 may be eliminated from the embroidery selection and fulfillment process.

Any of the above-described embodiments, may be included in a computer system. For example, although the system 100 is shown with a host computer 106 by way of example as one type of system upon which various aspects of the invention may be practiced, it should be appreciated that aspects of the invention are not limited to being implemented on the system as shown in FIG. 1. Various aspects of the invention may be practiced on one or more computers having a different architecture or components than that shown in FIG. 1. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor. Such a computer system generally includes a processor connected to one or more memory devices, such as a disk drive memory, a RAM memory, or other device for storing data. The memory is typically used for storing programs and data during operation of the computer system. Software, including programming code that implements embodiments of the present invention, is generally stored on a computer readable and/or writeable nonvolatile recording medium and then copied into memory wherein it is then executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

One or more portions of the system 100 and the host computer 106 may be distributed across one or more computer systems coupled to a communication network. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

Any of the elements included in the host computer 106 may be embodied in software, hardware, firmware, a combination of two or more the preceding, or a combination of any of the preceding and additional elements. More specifically, the rules engine may be implemented in software, hardware, firmware, a combination of two or more the preceding, or a combination of any of the preceding and additional elements.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system configured to generate a stitch file for an embroidery design selected by a user, the system comprising:
- a host system, including:
  - an image cache module configured to store a plurality of graphics files generated from pre-digitized stitch files of a plurality of text elements, for transmission over a network; and
  - an order server configured to receive an order selected by the user and transmitted over the network; and
- a user device configured to receive the plurality of graphics files via the network in advance of the user selecting any embroidered text element included in the embroidery design,
- wherein the user device is configured to allow a selection of an embroidery design based on an image of the stitched embroidery design provided to the user in advance of the user device transmitting the order selected by the user to the host system, the embroidery design including at least one embroidered text element.

2. The system of claim 1, further comprising a rules module configured to generate the stitch file.

3. The system of claim 2, further comprising a file server, wherein the order server includes the rules module, and wherein the file server includes the image cache module.

4. The system of claim 2, wherein the rules module is adapted to adjust at least one of a spacing between text elements included in the embroidery design and a height of at least one of the text elements.

5. The system of claim 4, wherein the rules module adjusts the spacing between the text elements to compensate for a perception of the spacing between the text elements by a human observer.

6. The system of claim 4, wherein the rules module adjusts the spacing between the text elements to compensate for a movement of a material in a stitching region where the embroidery design is located.

7. The system of claim 1, wherein the plurality of graphics files are stored in a graphics file format selected from a group consisting of a JPEG format, a GIF format, PNG format and a TIFF format.

8. The system of claim 1, wherein the order identifies a plurality of digital stitch files corresponding to a plurality of elements included in the embroidery design selected by the user.

9. The system of claim 1, wherein the user device is selected from a group consisting of a personal computer, a personal digital assistant, and a cell phone.

10. The system of claim 9, wherein the network is a wide area network.

11. A method of generating a stitch file for an embroidery design selected by a user, the embroidery design including at least one text element, the method comprising acts of:
- generating pre-digitized stitch files of a plurality of text elements, prior to a selection of the at least one text element by the user;
- transmitting a plurality of graphics files generated from the pre-digitized stitch files of embroidered text to the user in advance of the user selecting the at least one text element included in the embroidery design;
- providing, in advance of the user selecting the at least one text element, the plurality of graphics files to the user including a graphics file generated from a pre-digitized stitch file of the at least one text element;
- allowing a user-selection of the embroidery design by a user-selection of at least the graphics file generated from the pre-digitized stitch file of the at least one text element;
- displaying, in advance of an order placed electronically by the user for the embroidery design, an image of the user selected embroidery design to the user by displaying at least the at least one text element following the user selection;
- receiving, at a server, the order placed electronically by the user for the embroidery design, the order placed following each of the act of transmitting, the act of providing, the act of allowing and the act of displaying; and
- generating, following the act of receiving, the stitch file for the embroidery design selected by the user.

12. The method of claim 11, further comprising an act of applying a set of rules to adjust the spacing between two or more of a plurality of text elements selected by the user to generate a stitch file corresponding to the embroidered design.

13. The method of claim 11, wherein the user selected embroidery design is a first user selected embroidery design,
- wherein the method further comprises an act of displaying an image of a second user selected embroidery design at the display, wherein the second user selected design includes an edited version of the first user selected embroidery design.

14. The method of claim 13, wherein the second user selected embroidery design includes a text element that is an edited version of the at least one text element appearing in the first user selected embroidery design.

15. The method of claim 14, wherein the edited version included in the image of the second user selected design corresponds to a graphics file included in the plurality of graphics files.

16. The method of claim 14, further comprising an act of editing a color of the at least one text element for inclusion in the second user selected design.

17. The method of claim 11, wherein the order identifies a plurality of stitch files corresponding to a plurality of text elements and a plurality of design elements.

18. The method of claim 17, further comprising an act of generating a single stitch file including all of the plurality of text elements and the plurality of design elements.

19. The method of claim 11, further comprising acts of:

displaying the embroidery design to the user in a web browser; and providing a cache included in the web browser with graphics files of a plurality of embroidered text elements having one or more characteristics in common where the one or more characteristics are selected by the user.

20. The method of claim 19, further comprising an act of selecting the one or more characteristics from a group consisting of a text size, a text font, and a text color.

21. The method of claim 19, further comprising an act of automatically providing the graphics files to the cache following an initial selection of the one or more characteristics selected by the user.

22. The method of claim 19, further comprising an act of providing the cache with a graphics file of a design element selected by the user.

23. The method of claim 22, further comprising an act of providing the cache with a plurality of graphics files of the design element selected by the user, wherein each of the plurality of graphics files of the design element includes at least one characteristic that differs from a characteristic of others of the graphics files of the design element.

24. The method of claim 23, wherein each of the graphics files of the design element includes a different combination of colors than each of the others of the graphics files of the design element.

25. The method of claim 11, wherein the image corresponds to a plurality of individual stitch files, and wherein the act of generating includes an act of generating the stitch file from the plurality of individual stitch files.

26. The method of claim 11, wherein the embroidery design includes at least one design element, wherein the method further comprises:

presenting a graphics file generated from a pre-digitized stitch file of at least one design element;

allowing a user-selection of the embroidery design at least in part by a selection of the graphics file generated from the pre-digitized stitch file of at least one design element; and presenting the image of the user selected embroidery design to the user by displaying each of the at least one text element and the at least one design element following the user selection of each.

* * * * *